(12) United States Patent
Allen

(10) Patent No.: US 7,533,655 B2
(45) Date of Patent: May 19, 2009

(54) FUEL INJECTION SYSTEM FOR AN INTERNAL COMBUSTION ENGINE

(75) Inventor: Jeffrey Allen, Attleborough (GB)

(73) Assignee: Scion-Sprays Limited, Hethel, Norwich, Norfolk (GB)

( * ) Notice: Subject to any disclaimer, the term of this patent is extended or adjusted under 35 U.S.C. 154(b) by 0 days.

(21) Appl. No.: 12/062,008

(22) Filed: Apr. 3, 2008

(65) Prior Publication Data

US 2008/0184965 A1    Aug. 7, 2008

Related U.S. Application Data

(63) Continuation of application No. 11/461,945, filed on Aug. 2, 2006, now Pat. No. 7,438,050.

(30) Foreign Application Priority Data

| Aug. 5, 2005 | (GB) | ................... | 0516102.1 |
| Aug. 5, 2005 | (GB) | ................... | 0516235.9 |
| Oct. 28, 2005 | (GB) | ................... | 0522066.0 |
| Oct. 28, 2005 | (GB) | ................... | 0522068.6 |
| Mar. 28, 2006 | (GB) | ................... | 0606185.7 |

(51) Int. Cl.
*F02M 51/00* (2006.01)
(52) U.S. Cl. .................. 123/436; 123/490; 123/497
(58) Field of Classification Search ............... 123/436, 123/472, 490, 492, 497, 498, 504, 507
See application file for complete search history.

(56) References Cited

U.S. PATENT DOCUMENTS 3,937,195 A    2/1976    Woods (Continued)

FOREIGN PATENT DOCUMENTS

DE        672572      3/1939

(Continued)

OTHER PUBLICATIONS

European Patent Office, Standard Search Report for GB 0516235, Sep. 16, 2005, 3 pp., P. Lapeyronnie.

(Continued)

*Primary Examiner*—Hai H Huynh
(74) *Attorney, Agent, or Firm*—Luedeka, Neely & Graham, PC

(57) ABSTRACT

With reference to FIG. 1, the present invention provides an internal combustion engine (10) comprising a variable volume combustion chamber (13); an air intake system (18,20,21) for delivering charge air to the combustion chamber (13); an exhaust system (17) for relaying combusted gas from the combustion chamber (13) to atmosphere; and a fuel injection system (19, 21, 22, 23, 24, 25, 26) for delivering fuel into the charge air for combustion therewith in the combustion chamber (13). The fuel injection system (19,21, 22,23,24,25,26) comprises a fuel injector (19) which functions as a positive displacement pump and dispenses an amount of fuel which is fixed for each and every operation of the injector (19); and a controller (23) which controls the operation of the fuel injector (19). In response to an increasing engine speed and/or load the controller (23) increases in amount the fuel delivered per engine cycle by increasing in number the occasions the fuel injector (19) is operated per engine cycle. In response to a decreasing engine speed and/or load the controller (23) reduces in amount the fuel delivered per engine cycle by reducing in number the occasions the fuel injector (19) is operated per engine cycle.

41 Claims, 22 Drawing Sheets

U.S. PATENT DOCUMENTS

| | | | |
|---|---|---|---|
| 3,980,056 | A | 9/1976 | Kraus |
| 3,996,915 | A | 12/1976 | Demetrescu |
| 4,040,395 | A | 8/1977 | Demetrescu |
| 4,140,088 | A | 2/1979 | de Vulpillieres |
| 4,289,104 | A | 9/1981 | Takada et al. |
| 4,347,822 | A | 9/1982 | Casey |
| 4,499,878 | A | 2/1985 | Igashira et al. |
| 4,524,743 | A | 6/1985 | McAuliffe, Jr. et al. |
| 4,649,886 | A | 3/1987 | Igashira et al. |
| 4,653,455 | A | 3/1987 | Eblen et al. |
| 4,844,339 | A | 7/1989 | Sayer et al. |
| 4,928,655 | A | 5/1990 | Kako |
| 4,930,482 | A | 6/1990 | Kako |
| 5,080,079 | A | 1/1992 | Yoshida et al. |
| 5,090,386 | A | 2/1992 | Kurosu et al. |
| 5,092,301 | A | 3/1992 | Ostdiek |
| 5,261,369 | A | 11/1993 | Vernier |
| 5,390,647 | A | 2/1995 | Schechter |
| 5,438,968 | A | 8/1995 | Johnson et al. |
| 5,476,082 | A | 12/1995 | Carpenter et al. |
| 5,483,944 | A | 1/1996 | Leighton et al. |
| 5,685,485 | A | 11/1997 | Mock et al. |
| 5,694,898 | A | 12/1997 | Pontoppidan et al. |
| 5,697,343 | A | 12/1997 | Isozumi et al. |
| 5,810,264 | A | 9/1998 | Yost |
| 5,934,567 | A | 8/1999 | Fly |
| 5,992,016 | A | 11/1999 | Irgens |
| 6,209,315 | B1 | 4/2001 | Weigl |
| 6,354,079 | B1 | 3/2002 | Choi et al. |
| 6,516,607 | B1 | 2/2003 | Bruck et al. |
| 6,581,581 | B1 | 6/2003 | Bebich |
| 6,745,751 | B2 | 6/2004 | Seo et al. |
| 6,804,997 | B1 | 10/2004 | Schwulst |
| 6,912,991 | B2 | 7/2005 | Herden |
| 6,955,081 | B2 | 10/2005 | Schwulst |
| 6,964,263 | B2 | 11/2005 | Xi et al. |
| 6,966,760 | B1 | 11/2005 | Radue |
| 7,086,377 | B2 | 8/2006 | Best |
| 7,100,578 | B2 | 9/2006 | Yamazaki et al. |
| 7,225,793 | B2 | 6/2007 | Schwulst et al. |
| 2001/0029924 | A1 | 10/2001 | Phelps |
| 2003/0061870 | A1 | 4/2003 | Lodise et al. |
| 2004/0016417 | A1 | 1/2004 | Kerns et al. |
| 2004/0020475 | A1 | 2/2004 | Hashimoto et al. |
| 2004/0040534 | A1 | 3/2004 | Herden |
| 2005/0039526 | A1 | 2/2005 | Schwulst |
| 2007/0028900 | A1 | 2/2007 | Allen |

FOREIGN PATENT DOCUMENTS

| | | |
|---|---|---|
| DE | 19544241 | 6/1996 |
| DE | 19544241 A1 | 6/1996 |
| DE | 19846310 | 4/2000 |
| DE | 19846310 A1 | 4/2000 |
| DE | 10014553 | 10/2001 |
| DE | 10014553 A1 | 10/2001 |
| EP | 1367255 A1 | 2/2001 |
| EP | 1197657 A2 | 4/2002 |
| EP | 1340906 | 9/2003 |
| EP | 1340906 A1 | 9/2003 |
| EP | 1367255 | 12/2003 |
| EP | 1394398 A2 | 3/2004 |
| EP | 1460261 | 9/2004 |
| EP | 1460261 A1 | 9/2004 |
| GB | 1138536 | 1/1969 |
| GB | 2072261 | 9/1981 |
| GB | 2072261 A | 9/1981 |
| GB | 2222435 A | 3/1990 |
| GB | 2222435 | 7/1990 |
| GB | 2318388 | 4/1998 |
| GB | 2318388 A | 4/1998 |
| JP | 57198150 | 11/1982 |
| JP | 59087238 | 11/1982 |
| JP | 60017250 | 7/1983 |
| JP | 59 087238 | 5/1984 |
| JP | 59087238 | 5/1984 |
| JP | 60017250 | 1/1985 |
| JP | 62075064 | 6/1987 |
| JP | 62 075064 A | 9/1987 |
| SU | 1041731 | 4/1982 |
| SU | 1041731 A | 9/1983 |
| WO | 0028194 | 5/2000 |
| WO | 2004038189 A1 | 5/2004 |

OTHER PUBLICATIONS

Patent Acts 1977, Search Report for GB 0522066.0 Under Section 17, Mar. 13, 2006, 3 pp., John Twin.
Patent Acts 1977, Search Report for GB 0516102.1 Under Section 17, Dec. 6, 2005, 1 p., John Twin.
Patent Acts 1977, Search Report for GB 0522068.6 Under Section 17, Mar. 28, 2006, 3 pp., Catherine Allen.
Patent Acts 1977, Search Report for GB 0516235.9 Under Section 17, Oct. 19, 2005, 1 p., John Twin.
European Patent Office, Standard Search Report for GB 0606185, Jun. 6, 2006, 2 pp., T. Schmitter.
Patent Acts 1977, Search Report for GB 0606185.7 Under Section 17, Jul. 26, 2006, 2 pp., John Twin.
European Patent Office, Standard Search Report for GB 0522068, Jan. 9, 2006, 2 pp., F. Kooijman.
Search Report for GB0516102.1 (Dec. 7, 2005).
Search Report for GB0516235 (Sep. 27, 2005).
Search Report for GB0516235.9 (Oct. 19, 2005).
Search Report for GB0522066 (Oct. 23, 2006).
Search Report for GB0522066.0 (Mar. 13, 2006).
Search Report for GB0522068 (Jan. 9, 2006).
Search Report for GB0522068.6 (Mar. 29, 2006).
Search Report for GB0522068.6 (Oct. 18, 2007).
Search Report for GB0606104.8 (May 18, 2006).
Search Report for GB0606185.7 (Jul. 27, 2006).
Search Report for GB0703878.9 (May 14, 2007).
Search Report for GB0703878.9 (Sep. 20, 2007).
Search Report for GB0703878.9 (Sep. 26, 2007).
Search Report for GB0703880.5 (May 1, 2007).
Search Report for PCT/GB2006/002840 (Jul. 31, 2006).
Search Report for PCT/GB2006/002858 (Jul. 31, 2006).
International Search Report of PCT/GB2006/002840.
Written Opinion of the International Searching Authority of PCT/FB2006/002840.

FUEL INJECTION SYSTEM FOR AN INTERNAL COMBUSTION ENGINE

CROSS-REFERENCE TO RELATED APPLICATION

This application is a continuation of application Ser. No. 11/461,945, filed 2 Aug. 2006, now U.S. Pat. No. 7,438,050, and entitled FUEL INJECTION SYSTEM FOR AN INTERNAL COMBUSTION ENGINE, which claims priority to United Kingdom Application 0516235.9, filed 5 Aug. 2005, United Kingdom Application 0516102.1, filed 5 Aug. 2005, United kingdom Application 0522068.6, filed 28 Oct. 2005, United Kingdom Application 0522066.0, filed 28 Oct. 2005, and United Kingdom Application 0606185.7, filed 28 Mar. 2006, incorporated herein by reference in their entireties.

The present invention relates to a fuel injection system for an internal combustion engine.

Most internal combustion engines in automobiles currently use fuel injection systems to supply fuel to the combustion chambers of the engine. Fuel injection systems have replaced the earlier technology of carburettors because they give more control of delivery of fuel and enable the engine to meet emission legislation targets as well as improving the overall efficiency of the engine.

The injectors in current use are pulse width modulated. This means that each injector is operated for a chosen period of time in each cycle of the engine, the length of time that the injector is open dictating the volume of fuel delivered to the combustion chamber in that cycle. Typically, such pulse width modulation fuel injection systems use a fuel supply of a fixed pressure or an accurately known substantially constant pressure and on/off valves which can be activated for any predetermined time period under the control of an electronic controller. The result of such a combination of known pressure and variable, but controlled, opening times gives an injection of known quantities of fuel into the combustion chambers of the engine.

The above-described approach is taken for all gasoline injection systems (both port and direct injection systems) and also the new state-of-the-art high pressure "common rail diesel injection system. The latest common rail direct injection diesel fuel injection systems do sometimes use multiple injection pulses in order for better dispersal of fuel within the cylinder and better combustion results, but each of these pulses is of a variable time (albeit a time much shorter than that of the single pulse earlier fuel injection systems) and the controller will set the opening time of the injector in each pulse in order to control exactly the amount of fuel delivered. All of the prior art systems therefore require a pump, a pressure regulator and an injector (which functions effectively as an on/off valve) and a sophisticated electronic control module to control the opening time of each injector. The injectors used in the fuel injection systems are very accurate and quick in their response (rather than the earlier fuel injectors which were slow in their operation and suffered from a lack of repeatability). The latest injectors are able to open and close in less than one millisecond.

Whilst the sophisticated and highly developed fuel injection systems currently available are ideal for use in internal combustion engines in automobiles, there are many other applications for internal combustion engines where such a level of sophistication is not appropriate and too costly. For instance, small single cylinder low power output engines as used for lawn mowers, chain saws, small generators, mopeds, scooters, etc are built to very tight cost targets and have low power outputs, so therefore cannot afford the cost of a sophisticated fuel injection system nor the power required to run a fuel pump which provides pressurised fuel as required by the available sophisticated fuel injection systems. To date, such small engines have used traditional carburettor technology. However, it is now the case that such small engines will face the same type of exhaust gas emission legislation as the engines in automobiles and must be modified in a way so as to meet the emissions targets. Therefore, a cheap and simple system of fuel injection is required for such small engines.

The present invention provides in a first aspect an internal combustion engine comprising: a variable volume combustion chamber; an air intake system for delivering charge air to the combustion chamber; an exhaust system for relaying combusted gas from the combustion chamber to atmosphere; and a fuel injection system for delivering fuel into the charge air for combustion therewith in the combustion chamber; wherein the fuel injection system comprises: a fuel injector which functions as a positive displacement pump and dispenses an amount of fuel which is fixed for each and every operation of the injector; and a controller which controls the operation of the fuel injector; wherein: in each of at least a majority of engine cycles the fuel injector is operated on a plurality of occasions by the controller; in response to an increasing engine speed and/or load the controller increase in amount the fuel delivered per engine cycle by increasing in number the occasions the fuel injector is operated per engine cycle; and in response to a decreasing engine speed and/or load the controller reduces in amount the fuel delivered per engine cycle by reducing in number the occasions the fuel injector is operated per engine cycle.

The present invention provides in a second aspect an internal combustion engine comprising:

a variable volume combustion chamber;

an air intake system for delivering charge air to the combustion chamber;

an exhaust system for relaying combusted gas from the combustion chamber to atmosphere; and a fuel injection system for delivering fuel into the charge air for combustion therewith in the combustion chamber; wherein the fuel injection system comprises:

a plurality of fuel injectors each of which functions as a positive displacement pump and dispenses an amount of fuel which is fixed for each and every operation of the injector;

at least a first fuel injector of the plurality of fuel injectors dispensing a first set amount of fuel different to a second set amount dispensed by a second fuel injector of the plurality of fuel injectors; and a controller which controls the operation of each of the plurality of fuel injectors;

wherein:

in each of at least a majority of engine cycles the fuel injectors are operated on a plurality of occasions by the controller;

in response to an increasing engine speed and/or load the controller increases in amount the fuel delivered per engine cycle by increasing in number the occasions the fuel injectors are operated per engine cycle; and in response to a decreasing engine speed and/or load the controller reduces in amount the fuel delivered per engine cycle by reducing in number the occasions the fuel injectors are operated per engine cycle.

In a third aspect, the present invention provides an internal combustion engine comprising:

a variable volume combustion chamber;

an air intake system for delivering charge air to the combustion chamber;

an exhaust system for relaying combusted gas from the combustion chamber to atmosphere; and a fuel injection system for delivering fuel into the charge air for combustion therewith in the combustion chamber; wherein the fuel injection system comprises:

a fuel injector which functions as a positive displacement pump and dispenses an amount of fuel which is fixed for each and every operation of the injector; and a controller which controls the operation of the fuel injector;

wherein:

in each of at least a majority of engine cycles the fuel injector is operated on a plurality of occasions by the controller;

in response to an increasing engine speed and/or load the controller increases in amount the fuel delivered per engine cycle by increasing in number the occasions the fuel injector is operated per engine cycle;

in response to a decreasing engine speed and/or load the controller reduces in amount the fuel delivered per engine cycle by reducing in number the occasions the fuel injector is operated per engine cycle; and the fuel injector comprises:

a housing in which a fuel chamber is formed;

an electrical coil; and a piston which slides axially in a bore in the housing under the action of the electrical coil to force fuel out of the fuel chamber, the piston sliding between two end stops which ensure that the piston has a set distance of travel in each operation.

In a fourth aspect, the present invention provides an internal combustion engine comprising:

a variable volume combustion chamber;

an air intake system for delivering charge air to the combustion chamber;

an exhaust system for relaying combusted gas from the combustion chamber to atmosphere; and a fuel injection system for delivering fuel into the charge air for combustion therewith in the combustion chamber; wherein the fuel injection system comprises:

a plurality of fuel injectors each of which functions as a positive displacement pump and dispenses an amount of fuel which is fixed for each and every operation of the injector, at least a first fuel injector of the plurality of fuel injectors dispensing a first set amount of fuel different to a second set amount of fuel dispensed by a second fuel injector of the plurality of fuel injectors; and a controller which controls the operation of the fuel injectors;

wherein:

in each of at least a majority of engine cycles the fuel injector is operated on a plurality of occasions by the controller;

in response to an increasing engine speed and/or load the controller increases in amount the fuel delivered per engine cycle by increasing in number the occasions each fuel injectors are operated per engine cycle;

in response to a decreasing engine speed and/or load the controller reduces in amount the fuel delivered per engine cycle by reducing in number the occasions each fuel injector is operated per engine cycle; and each fuel injector comprises:

a housing in which a fuel chamber is formed;

an electrical coil; and a piston which slides axially in a bore in the housing under the action of the electrical coil to force fuel out of the fuel chamber, the piston sliding between two end stops which ensure that the piston has a set distance of travel in each operation.

In a fifth aspect the present invention provides an internal combustion engine comprising:

a variable volume combustion chamber;

an air intake system for delivering charge air to the combustion chamber;

an exhaust system for relaying combusted gas from the combustion chamber to atmosphere; and a fuel injection system for delivering fuel into the charge air for combustion therewith in the combustion chamber; wherein the fuel injection system comprises:

a fuel injector which functions as a positive displacement pump and dispenses an amount of fuel which is fixed for each and every operation of the injector; and a controller which controls the operation of the fuel injector;

wherein:

in each of at least a majority of engine cycles the fuel injector is operated on a plurality of occasions by the controller;

in response to an increasing engine speed and/or load the controller increases in amount the fuel delivered per engine cycle by increasing in number the occasions the fuel injector is operated per engine cycle;

in response to a decreasing engine speed and/or load the controller reduces in amount the fuel delivered per engine cycle by reducing in number the occasions the fuel injector is operated per engine cycle;

the fuel injector is driven mechanically by a camming surface, the fuel injector comprising a piston acted on by a biasing spring and displaceable by the camming surface, with motion of the piston in one direction drawing fuel into a fuel chamber of the fuel injector and motion of the piston in the other direction forcing fuel out of the fuel chamber, the camming surface comprising a plurality of cam lobes each of which can drive the piston during each engine cycle and the controller controlling how many of the cam lobes in each engine cycle cause the piston to force fuel out of the fuel injector;

the fuel injector comprises a fuel outlet through which fuel is forced out of the fuel chamber by the piston, and a fuel inlet through which fuel is introduced into the fuel chamber, the fuel injector further having a one-way inlet valve operable to allow fuel to flow into the fuel chamber from the fuel inlet while preventing flow of fuel back out of the fuel chamber to the fuel inlet and a one-way outlet valve operable to allow fuel to flow out of the fuel chamber to the fuel outlet while preventing flow of fuel back onto the fuel chamber from the fuel outlet; and the one-way inlet valve can be disabled by the controller and when disabled allows flow of fuel back out of the fuel chamber to the fuel inlet, the motion of the piston when the first one-way valve is disabled serving only to draw in fuel from the fuel inlet into the fuel chamber and then expel the fuel out of the fuel chamber back to the fuel inlet.

In a sixth aspect the present invention provides an internal combustion engine comprising:

a variable volume combustion chamber;

an air intake system for delivering charge air to the combustion chamber;

an exhaust system for delivering charge air to the combustion chamber;

an exhaust system for relaying combusted gases from the combustion chamber to atmosphere; and a fuel injection system for delivering fuel into the charge air for combustion therewith in the combustion chamber;

wherein the fuel injection system comprises:

a plurality of fuel injectors each of which functions as a positive displacement pump and dispenses an amount of fuel which is fixed for each and every operation of the injector, at least a first fuel injector of the plurality of fuel injectors dispensing an amount of fuel different to a second fuel injector of the plurality of fuel injectors; and a controller which controls operation of each of the plurality of fuel injectors; wherein:

in each of at least a majority of engine cycles the fuel injectors are operated on a plurality of occasions by the controller;

in response to an increasing engine speed and/or load the controller increases in amount the fuel delivered per engine cycle by increasing in number the occasions the fuel injectors are operated per engine cycle;

in response to a decreasing engine speed and/or load the controller reduces in amount the fuel delivered per engine cycle by reducing in number the occasions the fuel injectors are operated per engine cycle;

each fuel injector is driven mechanically by a camming surface, each fuel injector comprising a piston acted on by a biasing spring and displaceable by the camming surface with motion of the piston in one direction drawing fuel into a fuel chamber of the fuel injector and motion of the piston in the other direction forcing fuel out of the fuel chamber, the camming surface comprising a plurality of cam lobes each of which can drive the piston during each engine cycle and the controller controlling how many of the cam lobes in each engine cycle cause the piston to force fuel out of each fuel injector;

each fuel injector comprises a fuel outlet through which fuel is forced out of the fuel chamber by the piston,—and a fuel inlet through which fuel is introduced into the fuel chamber, each fuel injector further having a first one-way valve operable to allow fuel to flow into the fuel chamber from the fuel inlet while preventing flow of fuel back out of the fuel chamber to the fuel inlet and a second one-way valve operable to allow fuel to flow out of the fuel chamber to the fuel outlet while preventing flow of fuel back into the fuel chamber from the fuel outlet; and the one-way inlet valve of each fuel injector can be disabled by the controller and when disabled allows flow of fuel back out of the fuel chamber to the fuel inlet, the motion of the piston when the first one-way valve is disabled serving only to draw in fuel from the fuel inlet into the fuel chamber and then expel the fuel out of the fuel chamber back to the fuel inlet.

Preferred embodiments of the present invention will now be described with reference to the accompanying drawings, in which.

Figure 1:
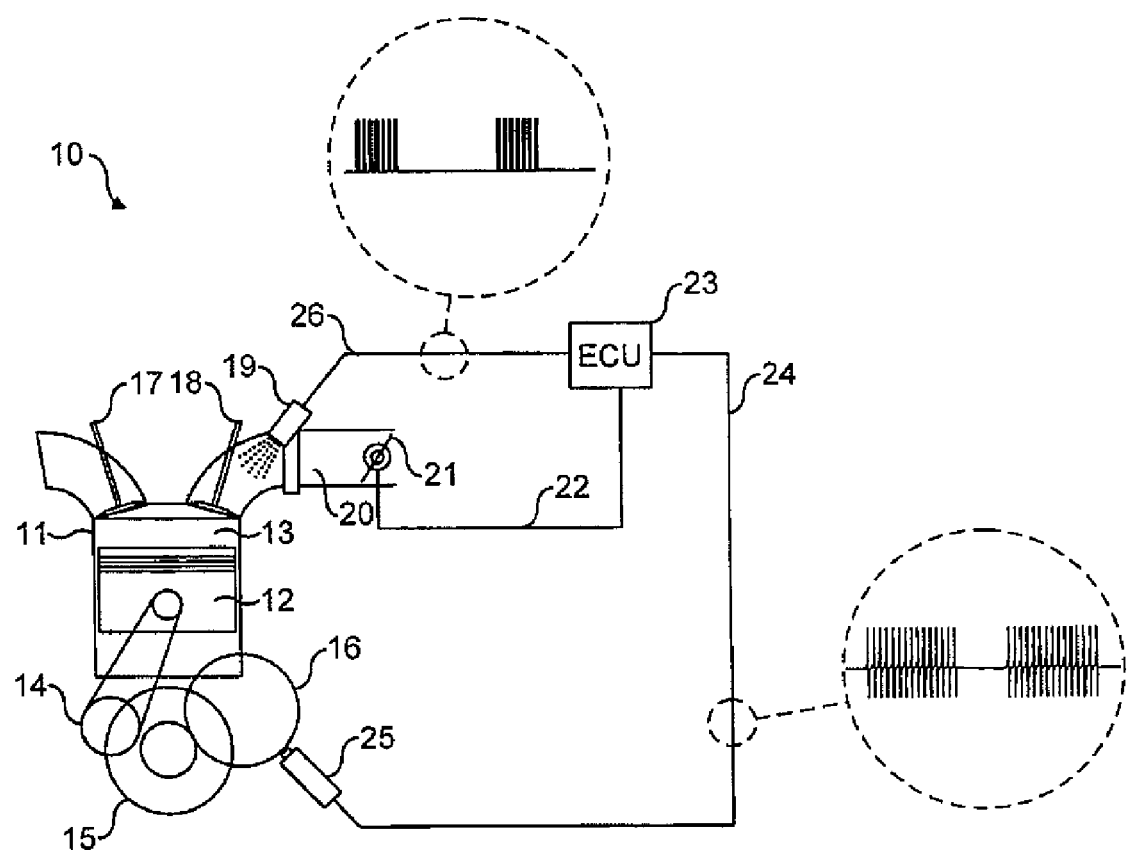
FIG. 1 is a schematic representation of an internal combustion engine with a fuel injection system according to the present invention.
Figure 3:
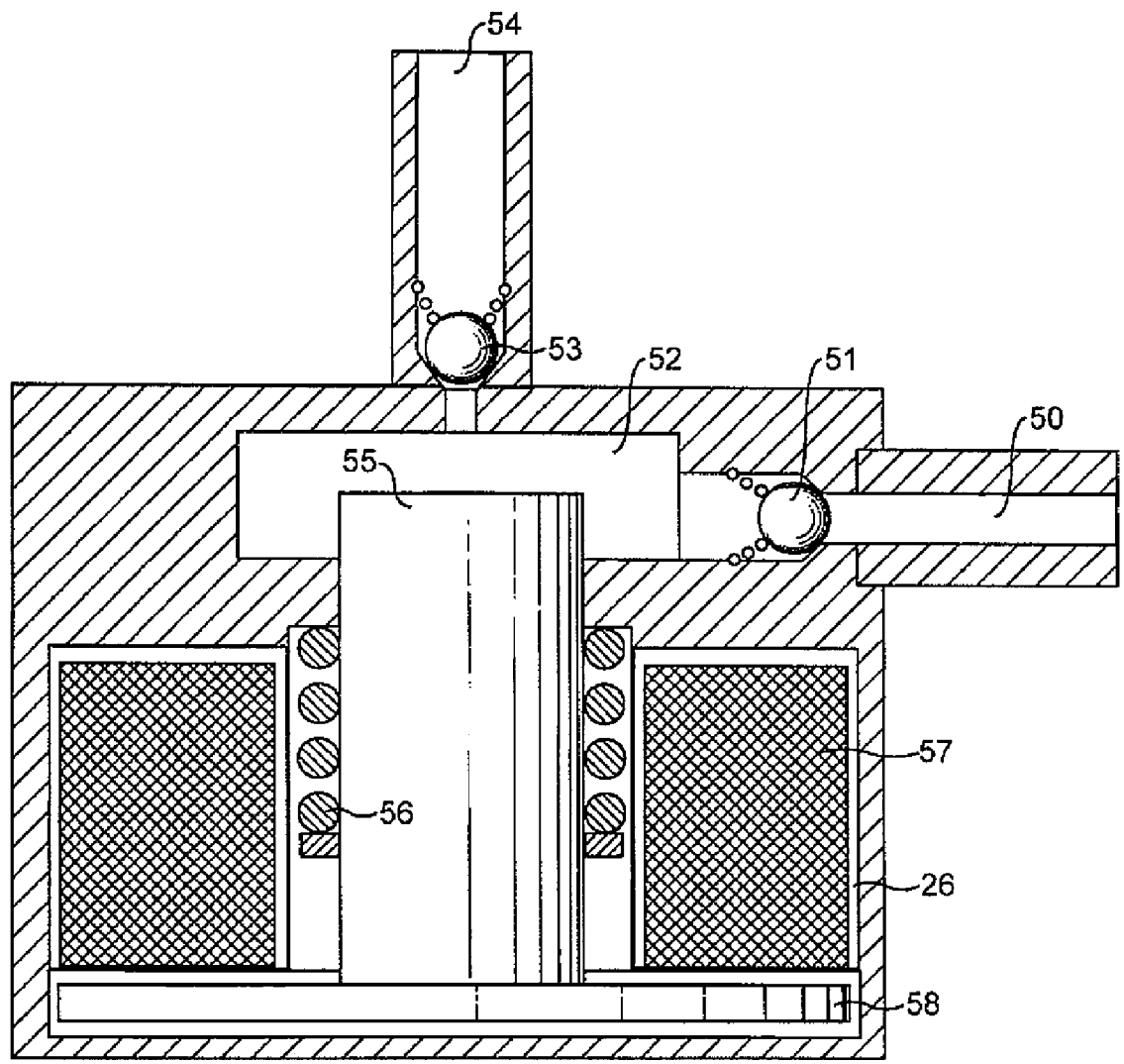
FIG. 3 is a schematic illustration of a second type of fuel injector suitable for use in the engine of FIG. 1.
Figure 7:
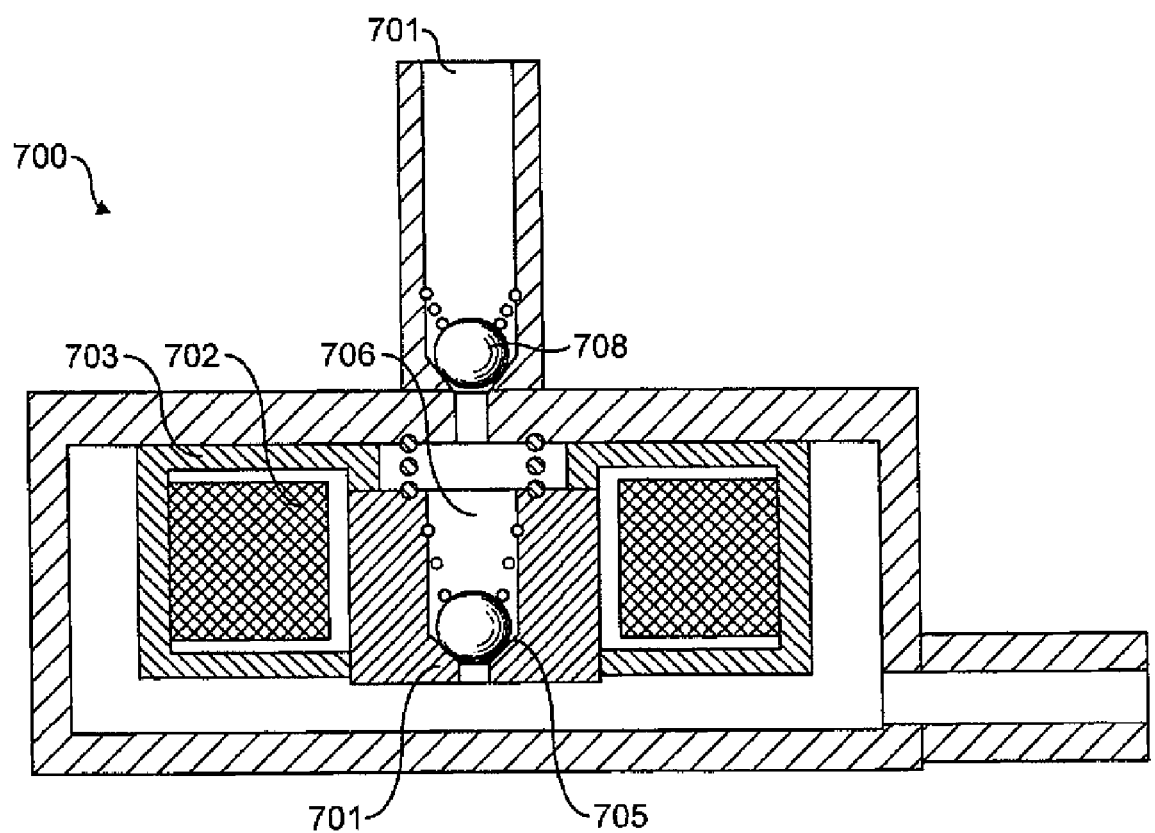
FIG. 7 is a schematic illustration of a fourth type of fuel injector suitable for use in the engine of FIG. 1.
Figure 8A:
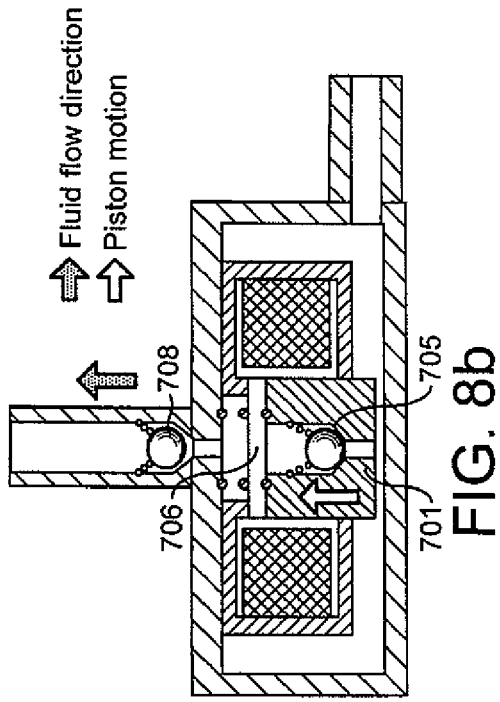
Figure 9:
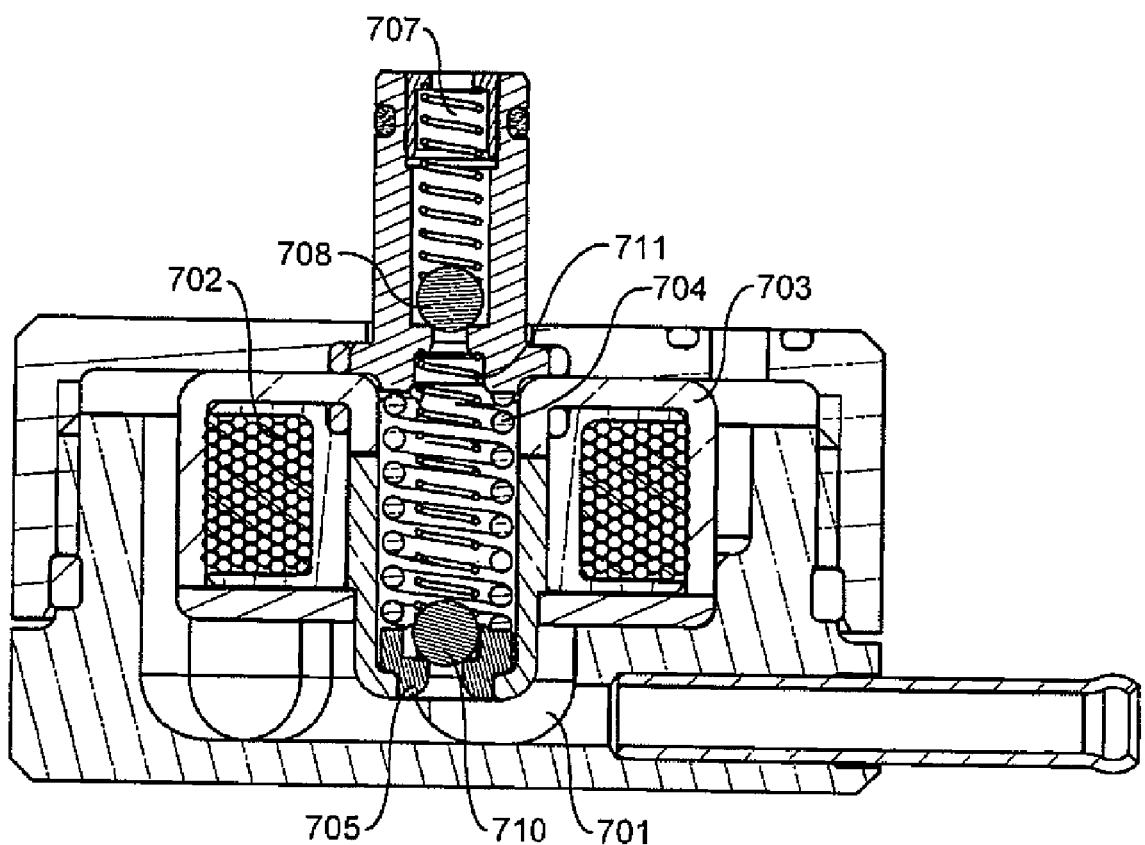
Figure 10A:
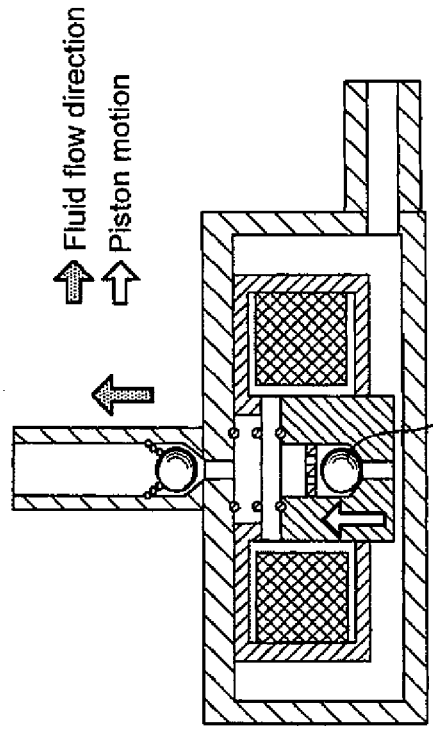
Figure 11:
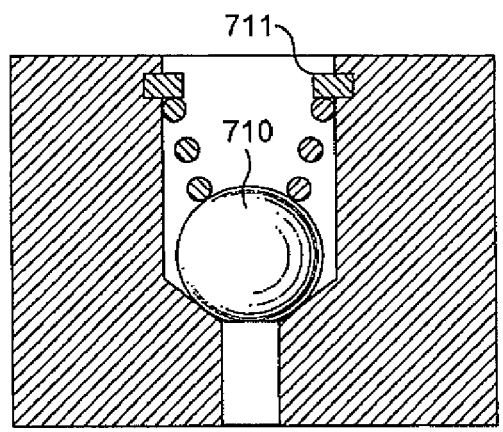
Figure 12:
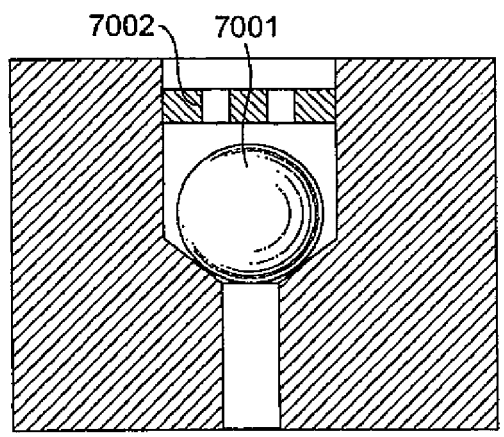
Figure 13:
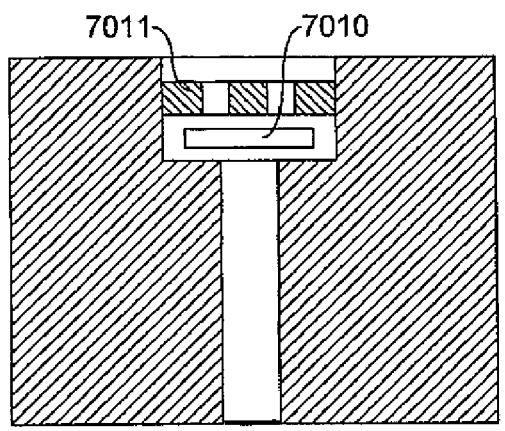
Figure 14:
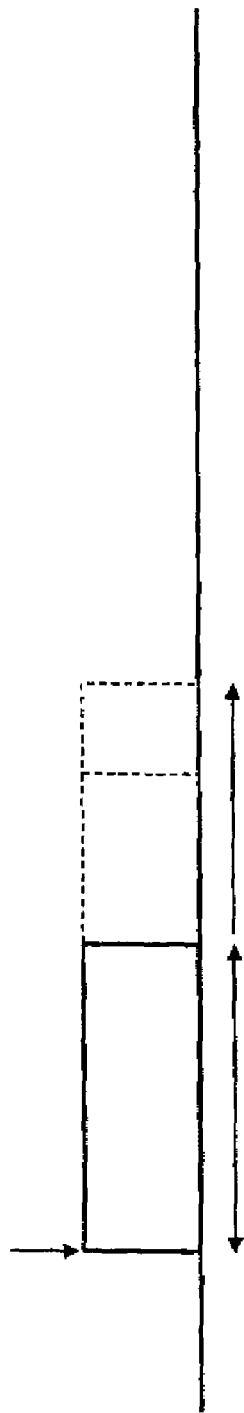
Figure 15:
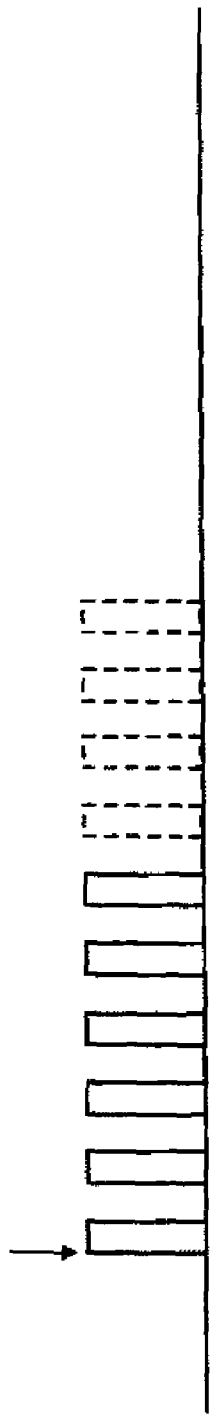
Figure 16A:
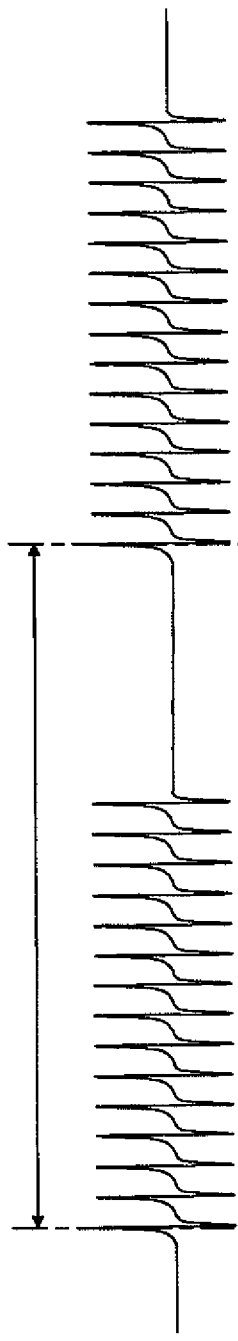
Figure 16B:
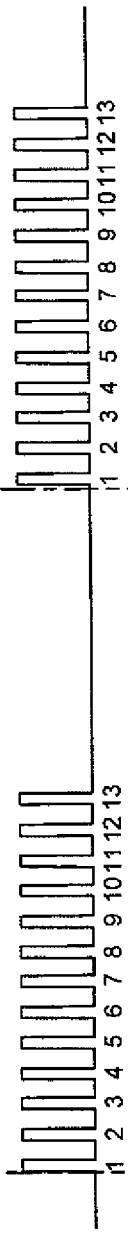
Figure 16C:
Figure 16D:
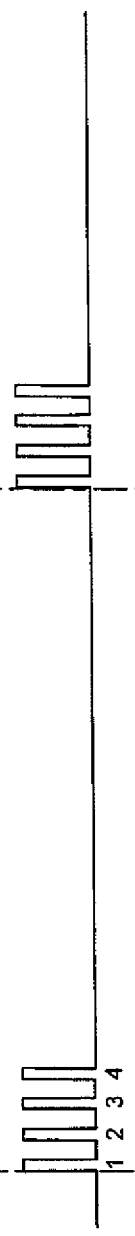
Figure 16E:
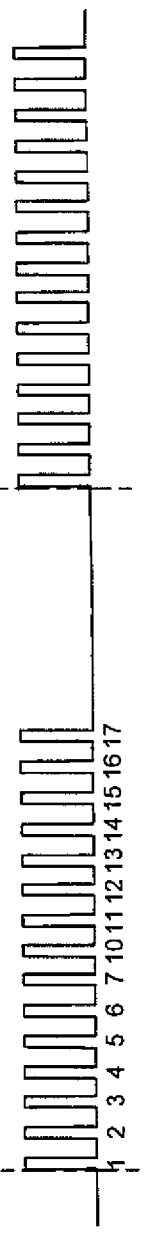
Figure 17:
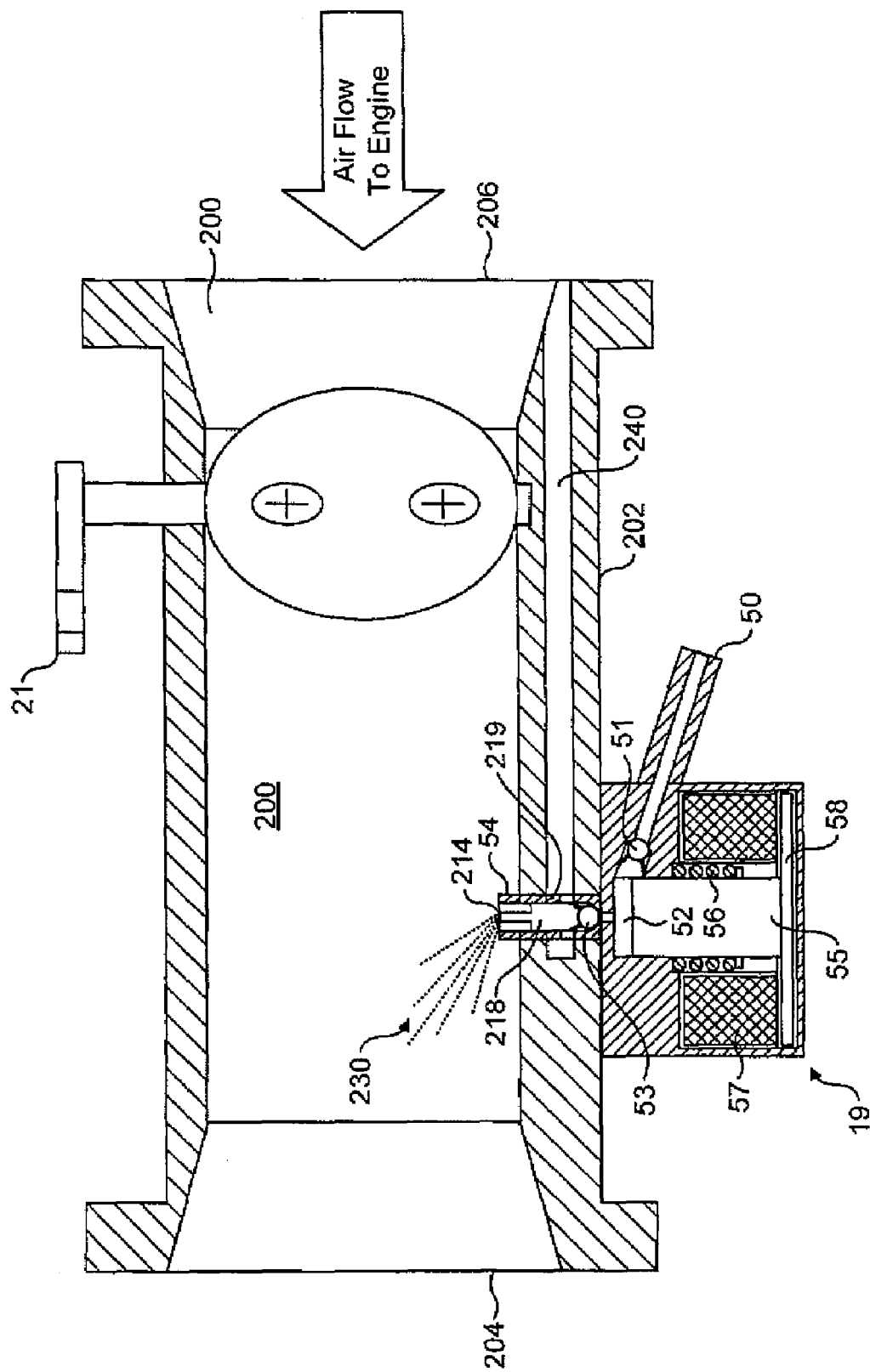
Figure 18:
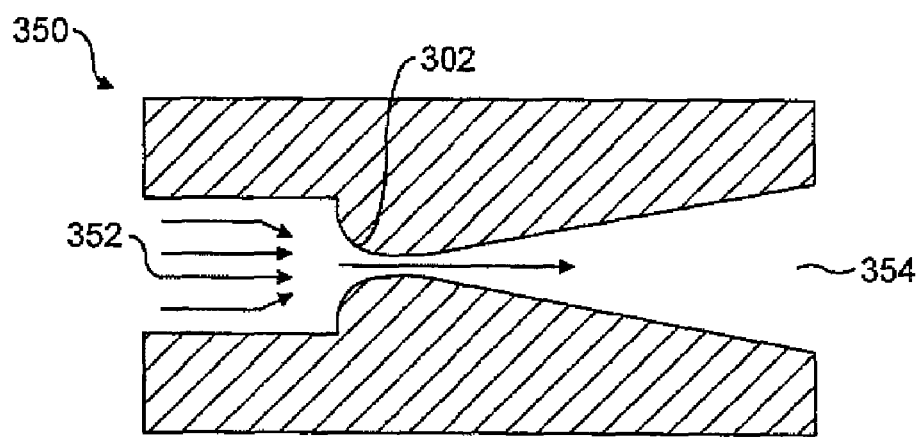
Figure 19:
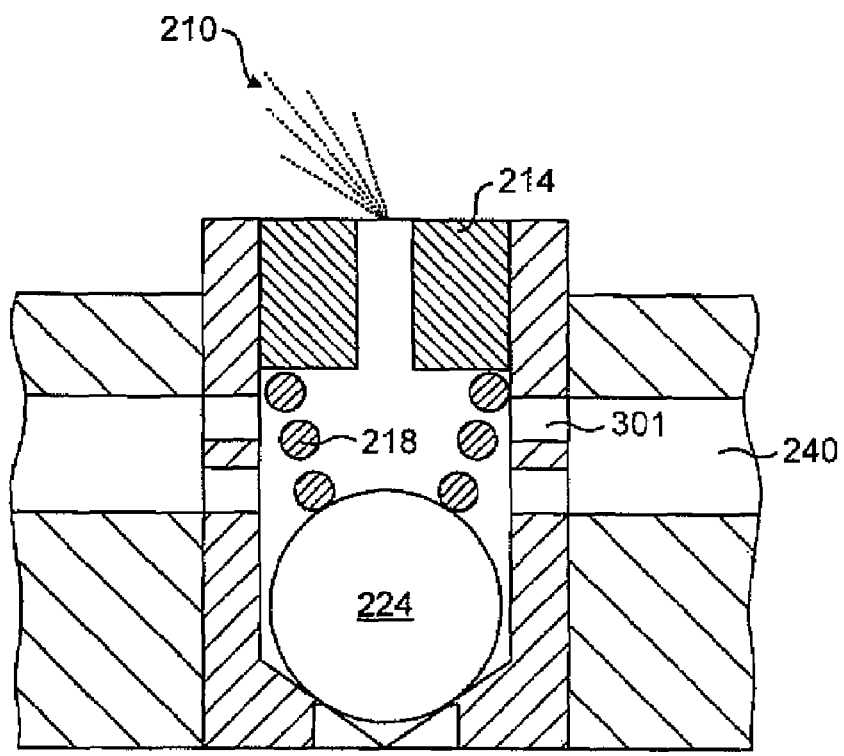
Figure 20A:
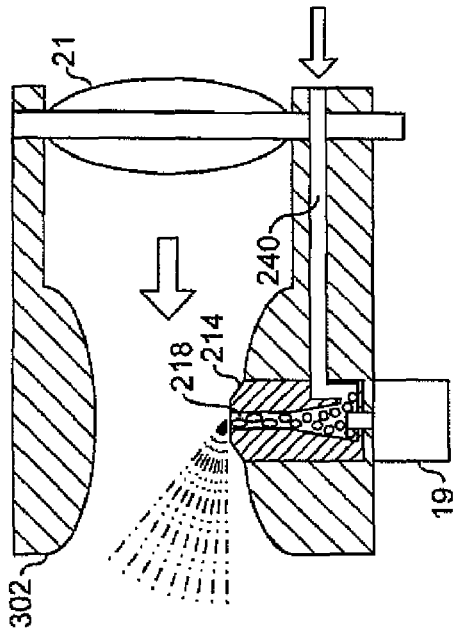
Figure 20C:
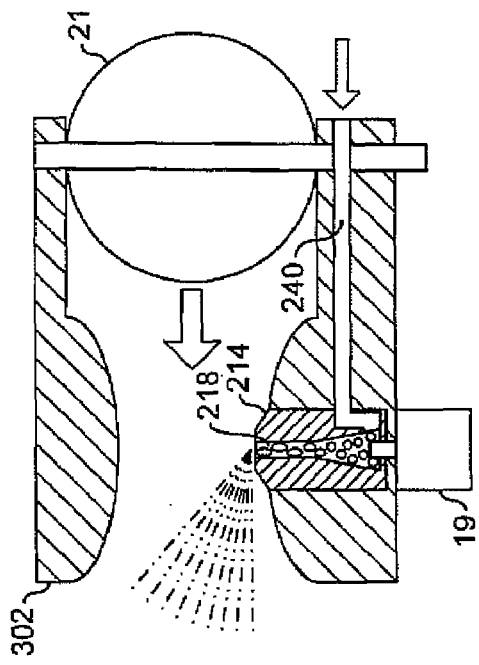
Figure 20B:
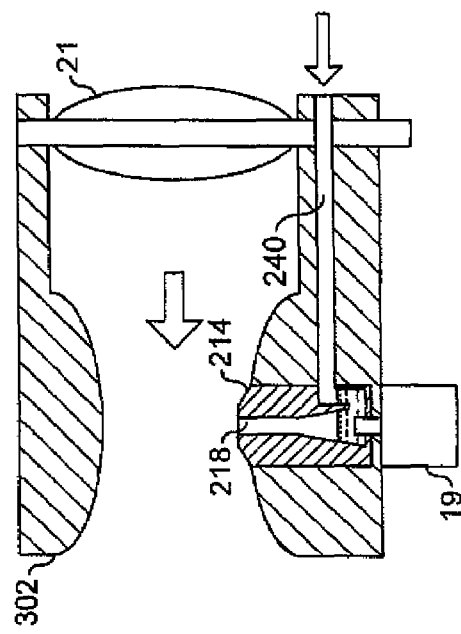
Figure 20D:
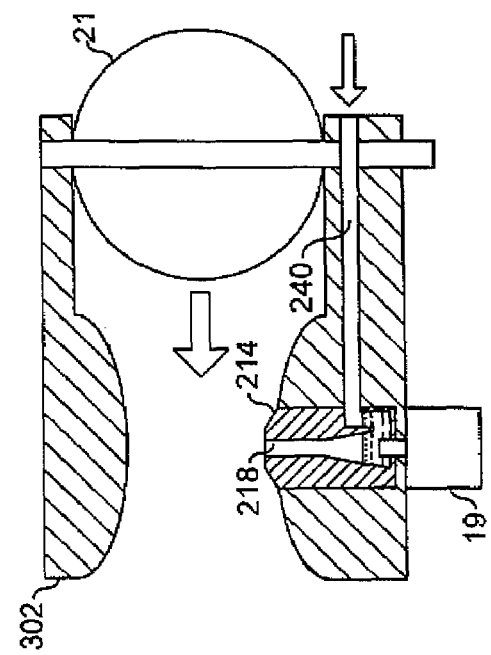
Figure 21A:
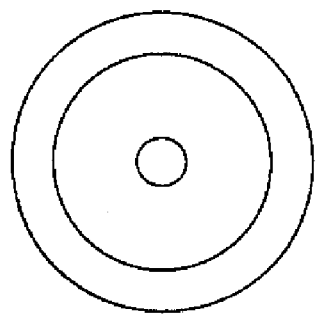
Figure 21B:
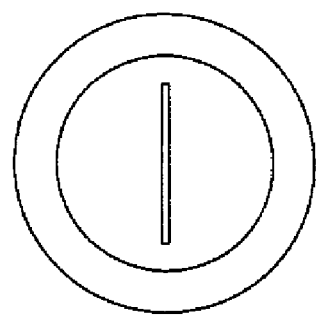
Figure 21C:
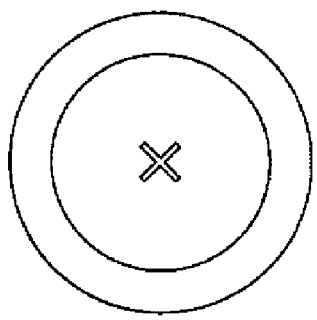
Figure 21D:
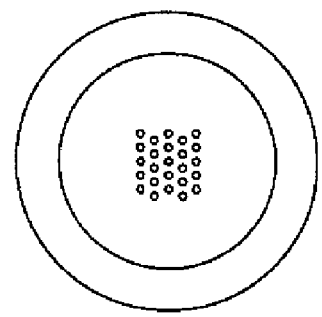
Figure 22:
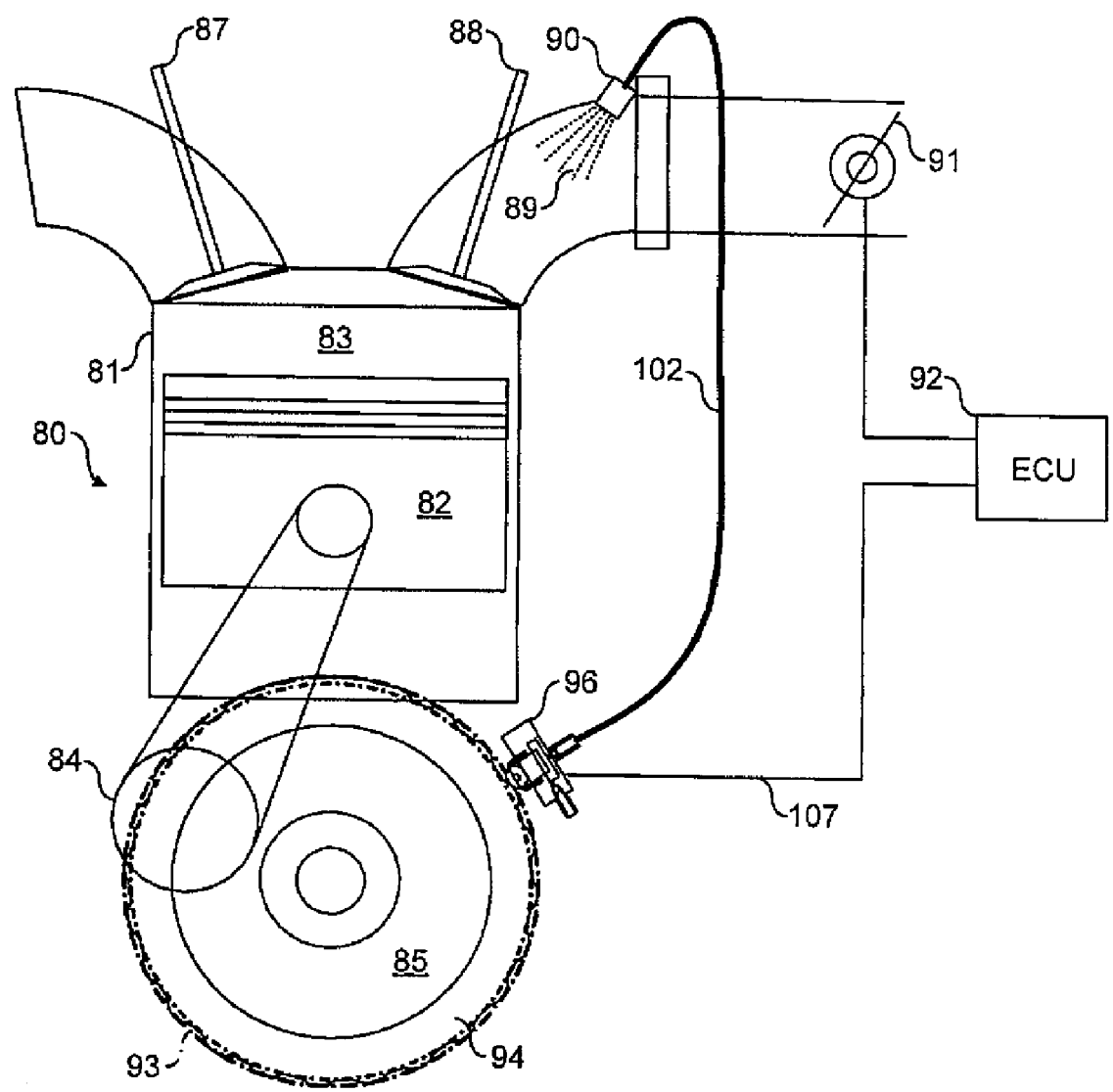
Figure 23:
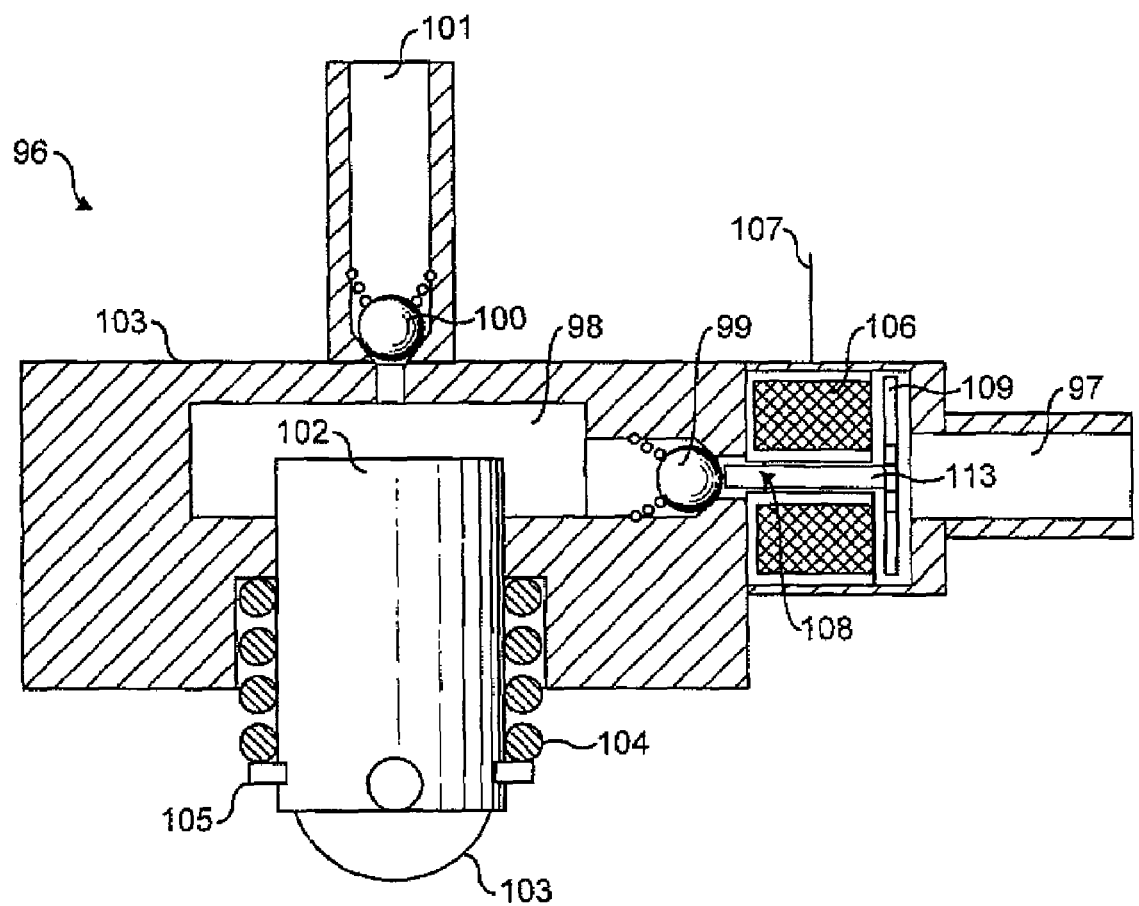
Figure 24:
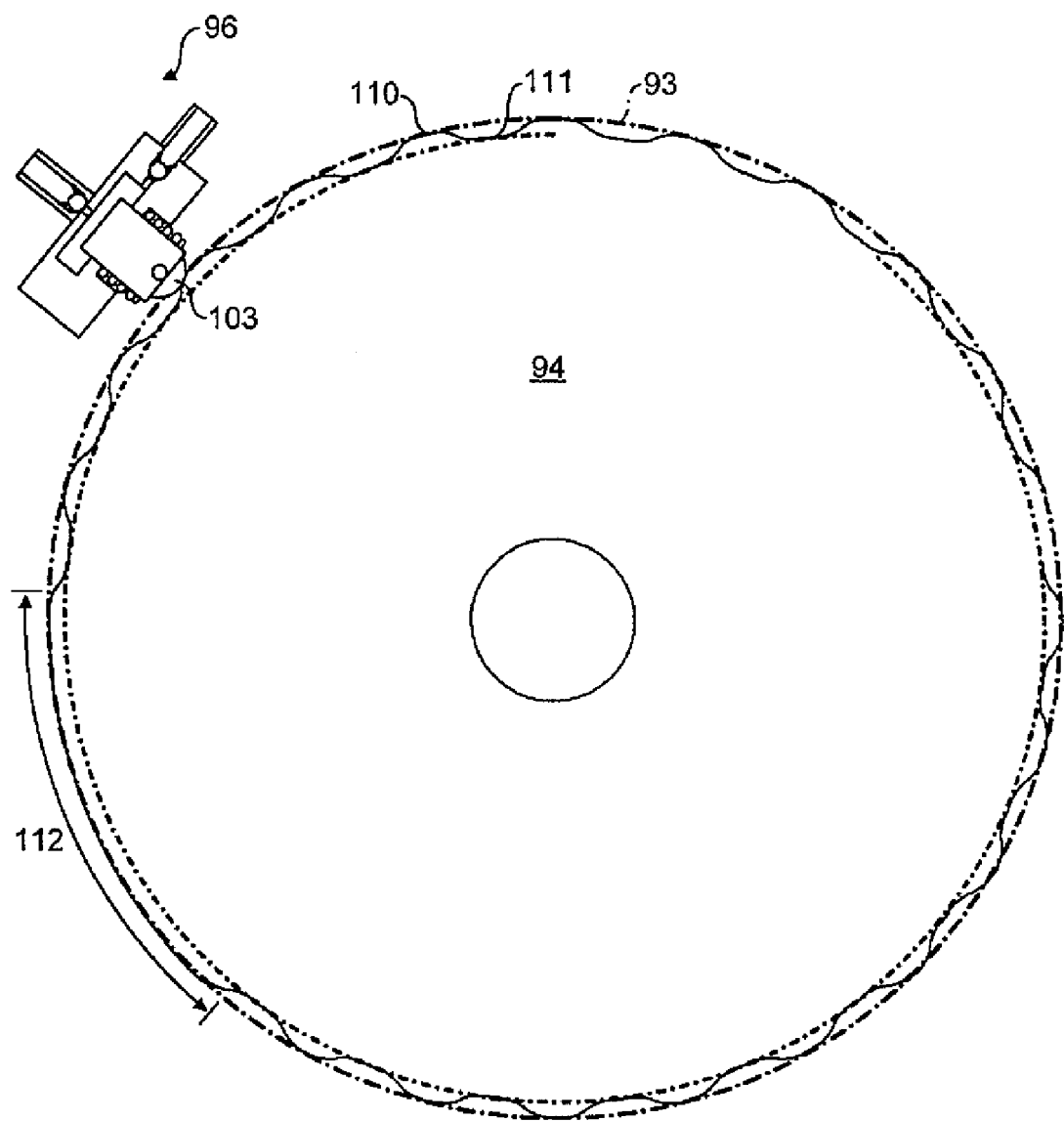
Figure 25:
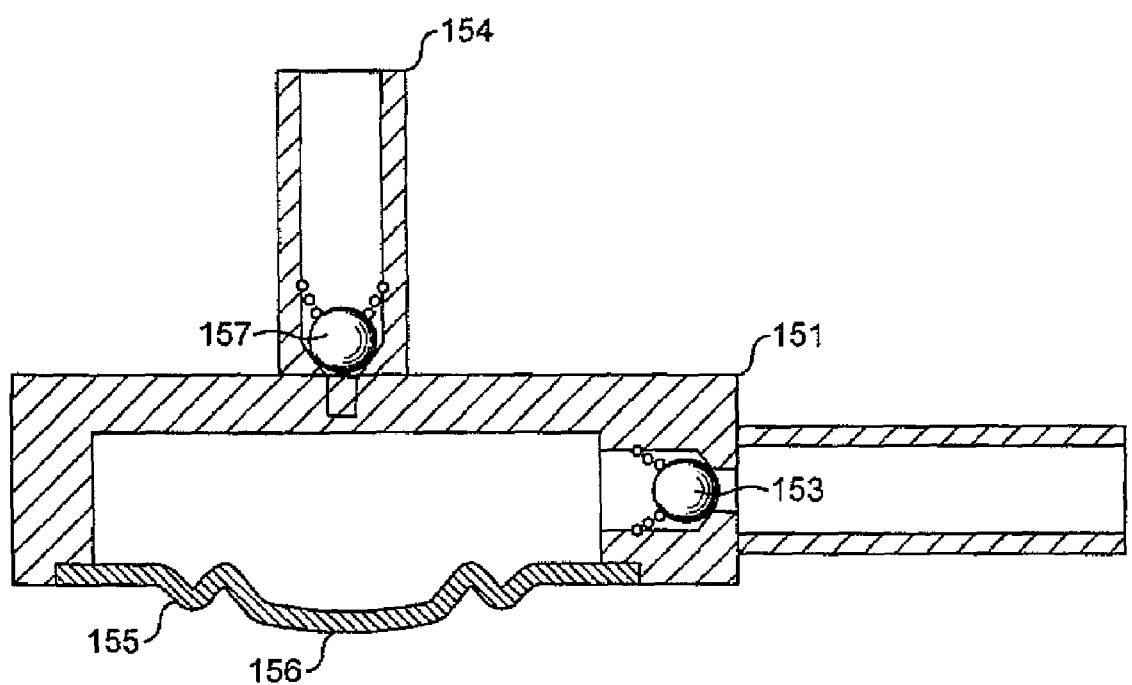
Figure 26:
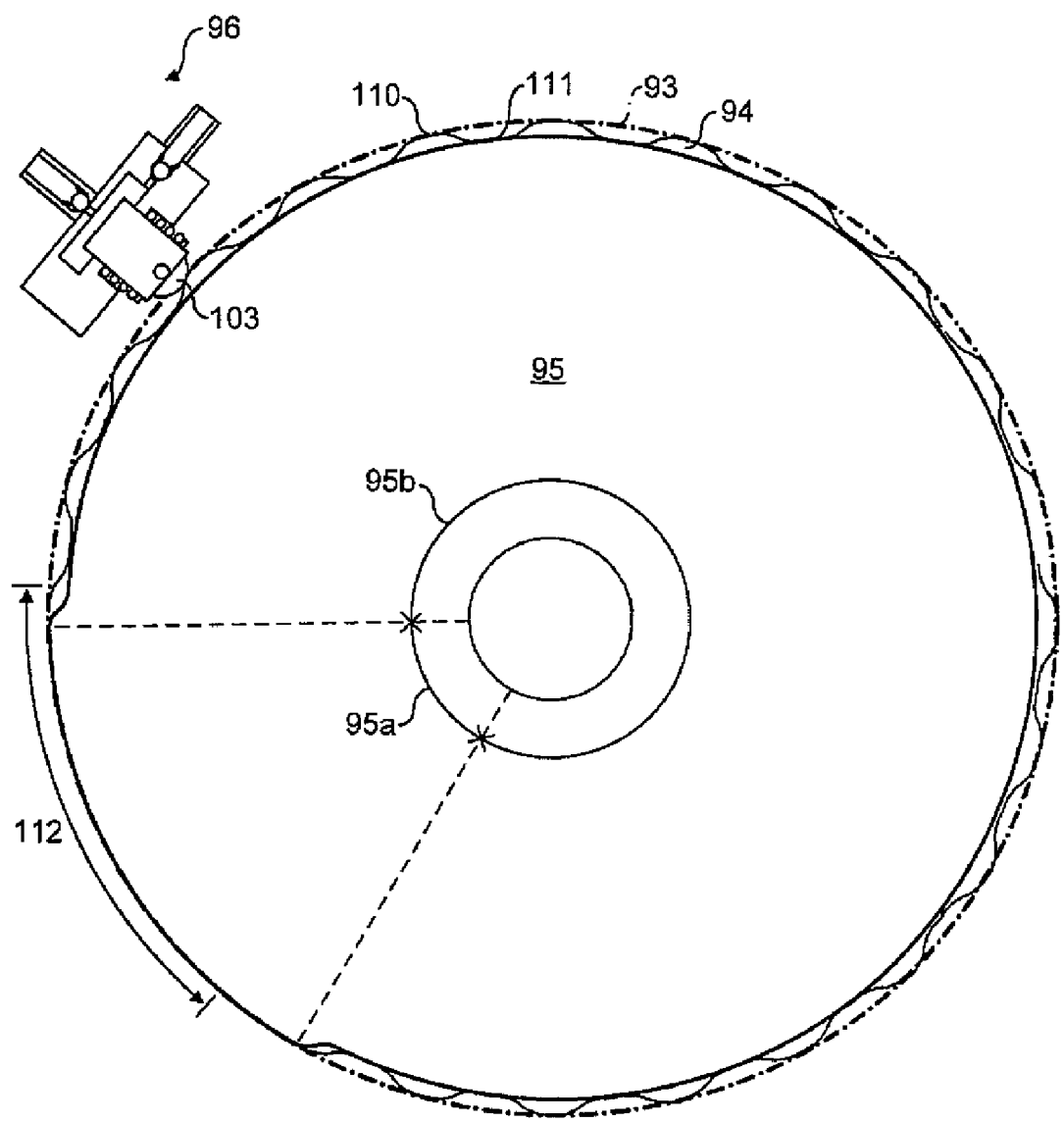

FIGS. 8a),b), c) and d) illustrate operation of the FIG. 7 fuel injector;

FIG. 9 is a more detailed illustration of the FIG. 7 fuel injector;

FIGS. 10a) to 10d) illustrate operation of a modified version of the fuel injection of FIGS. 7 to 9;

FIG. 11 illustrates a one-way check valve of the fuel injector of FIGS. 7 to 9;

FIG. 12 illustrates a one-way check valve of the fuel injector of FIGS. 10a) to 10d);

FIG. 13 illustrates a one-way check valve which could be used in the fuel injector of any of FIGS. 7 to 10d) in place of the illustrated check valves;

FIG. 14 shows the type of signal used in the prior art fuel injector systems to control the amount of fuel delivered to the combustion chamber in each engine cycle;

FIG. 15 shows the control signal used by the present invention to activate the fuel injector of FIG. 1 (e.g. a fuel injector of the type of any one of FIGS. 2 to 10d) in order to control the amount of fuel delivered into the combustion chamber in each operating cycle;

FIG. 16 shows at:

FIG. 16a) a rotation signal taken from an engine cam shaft or crank shaft of the FIG. 1 engine;

FIG. 16b) a control signal generated for full load operation of the FIG. 1 engine;

FIG. 16c) a control signal generated for part load operation of the FIG. 1 engine, FIG. 16d) a control signal generated for engine idling of the FIG. 1 engine, and FIG. 16e) a control signal generated during starting of the FIG. 1 engine;

FIG. 17 is a schematic representation of the inlet passage of the FIG. 1 internal combustion engine with a slightly modified version of the FIG. 3 fuel injector in place;

FIG. 18 shows a cross-sectional view of a nozzle of the fuel injector of FIG. 17;

FIG. 19 shows a cross-sectional view of a part of the fuel injector of FIG. 17;

FIGS. 20a) to 20d) are schematic illustrations of the operation of the fuel injector of FIGS. 17 to 19;

FIGS. 21a) to 21d) show alternative nozzle orifice shapes of the fuel injector of FIGS. 17 to 20;

FIG. 22 is a schematic representation of a second embodiment of internal combustion engine with a fuel injection system according to the present invention;

FIG. 23 is a schematic illustration of a fuel injector suitable for use with the engine of FIG. 22;

FIG. 24 is a schematic illustration of the fuel injector of FIG. 23 and its arrangement with a camming surface used to drive it;

FIG. 25 is a schematic illustration of a second embodiment of fuel injector suitable for use in the FIG. 18 engine in place of the fuel injector illustrated in FIG. 18; and FIG. 26 is an illustration of a modification of the camming arrangement of FIG. 24.

Turning first to FIG. 1, there can be seen in the Figure an internal combustion engine 10 comprising a cylinder 11 in which reciprocates a piston 12 with the cylinder 11 and piston 12 defining between them a combustion chamber 13. The piston 12 is connected by a connecting rod 14 to a crankshaft 15, which in turn is connected to a cam shaft 16. A mechanism (not shown) such as a push-rod type mechanism, is used between the cam shaft 16 and two poppet valves 17 and 18 which are the exhaust and inlet valves of the engine. The cam shaft 16 will drive the inlet valve 18 and the exhaust valve 17 to open in timed relationship to the movement of the piston 12 in the cylinder 11 with return springs biasing the poppet valves 17 and 18 back into their valve seats. The engine 10 is a simple engine, a single cylinder engine of, for instance, a lawn mower or other garden equipment.

The engine 10 has a fuel injection system comprising a fuel injector 19 arranged to deliver fuel into an inlet passage 20 upstream of the inlet valve 18. A throttle valve 21 is placed in the inlet passage 20 to throttle the flow of charge air into the combustion chamber 13. A sensor is connected to throttle valve 21 and feeds back the signal via a line 22 to an electronic control unit 23, the signal indicating the rotational position of the throttle valve 21 and therefore engine load. The ECU 23 also receives a timing signal via a line 24, the timing signal being generated by a cam shaft sensor 25 (which could be replaced by a crankshaft sensor instead). Having regard to the timing signal produced by the sensor 25 and the load signal produced by the sensor attached to throttle valve 21, the ECU 23 generates a control signal which is relayed via line 26 to the injector 19 and controls operation of the injector 19.

Figure 2:
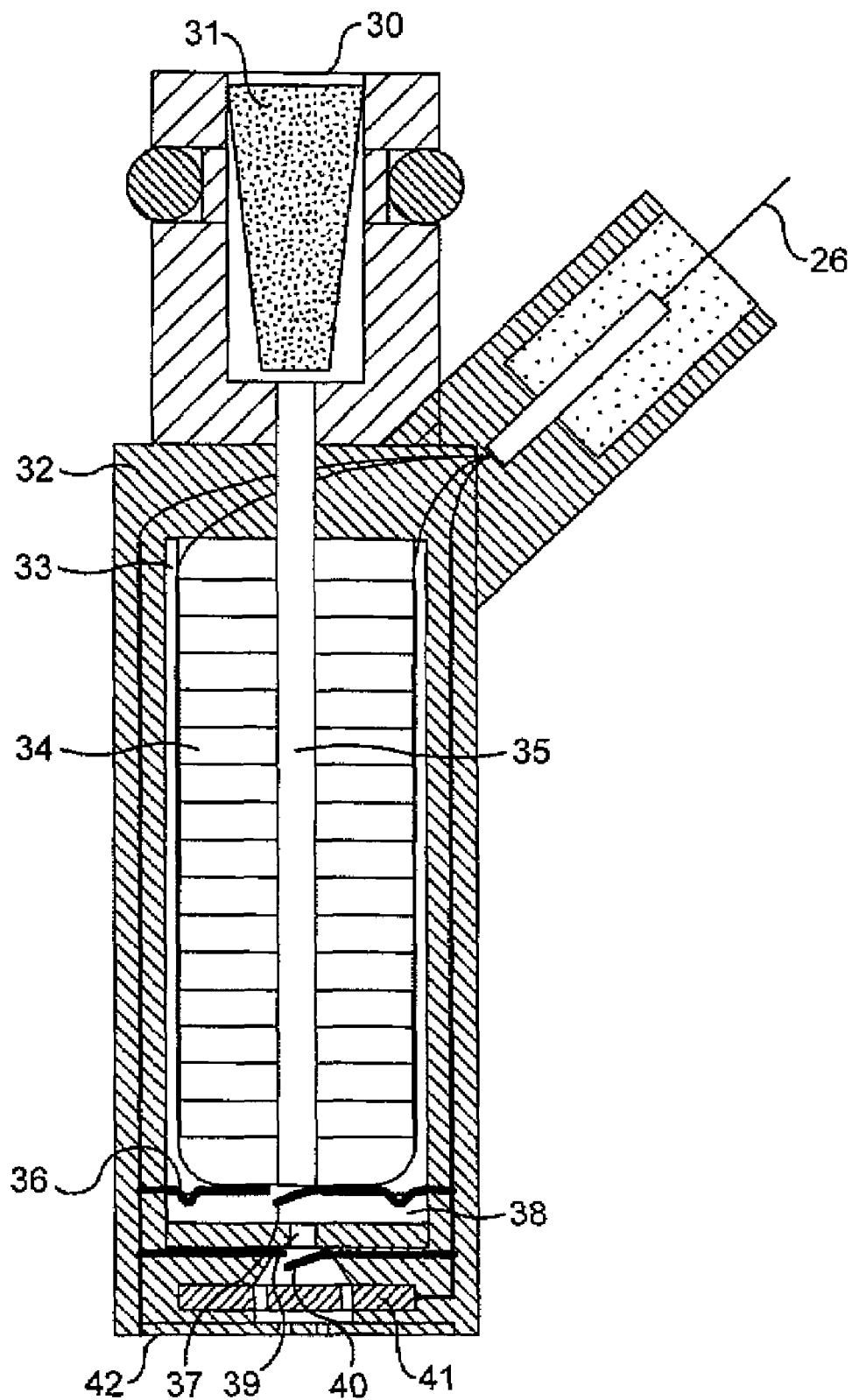
FIG. 2 is a schematic illustration of a first type of fuel injector according to the present invention suitable for use in the engine of FIG. 1.

A first example of injector 19 is shown in FIG. 2. The injector 19 has a fuel inlet 30 in which a filter 31 is placed to remove any impurities from the fuel before it passes into the main body of the injector. The main body 32 of the injector has a cavity 33 in which is located a stack 34 of piezo-electric elements. The fuel introduced by the inlet 30 passes along a passage 35 through the stack 34. A flexible diaphragm 36 abuts a free end of the stack 34 and the diaphragm 36 incorporates in it a one-way valve 37 aligned with the passage 35 passing through the stack 34. A section 38 of the cavity 33 is defined by the flexible diaphragm 36 and leading from this section 38 there is a fuel outlet passage 39 which is opened and closed by a one-way reed valve 40. Downstream of the reed valve 40 is a high voltage electrostatic charging electrode 41 having apertures therethrough allowing passage of fuel. Downstream of the electrode 41 is a fuel outlet disc 42 having multiple fuel outlet orifices defined in it; this disc 42 will also be charged so to function as an electrode so that the electrode 41 and disc 42 together apply a charge to the fuel passing through the injector and this aids atomisation of the fuel.

A simple gravity feed fuel delivery system (not shown) will relay fuel from a fuel tank (not shown) to the fuel inlet 30, the fuel then being filtered by the filter 31. Fuel is then drawn into and expelled from the fuel injector of FIG. 2 by the expansion of the stack 34 of piezo-electric elements. When a voltage is applied to the piezo-electric elements of the stack 34 they expand and this expansion causes the stack 34 to grow in length and push on the flexible diaphragm 36. When this happens, the one-way valve 37 will close and fuel in the section 38 will be forced out of the section 38 by the flexing diaphragm 36, the diaphragm 36 flexing under the action of the stack 34. The one-way valve 40 will open to allow fuel to be expelled from the section 38 and the expelled fuel will then pass through the orifices in the charging electrode 41 and then through the orifices of the fuel outlet disc 42 into the air inlet passage 20 (shown in FIG. 1). The fuel passing the electrode 41 and disc 42 will receive an electrostatic charge and this electrostatic charge will help in the atomisation of the fuel passing out of the orifices of the fuel outlet disc 42.

Once the voltage is removed from the stack 34 of piezo-electric elements then the stack 34 will reduce to its original length and the flexible diaphragm 36, which is resilient in nature, will move back to its original position, thereby increasing the volume of the section 38 of the cavity in the injector. This in turn will cause the one-way valve 40 to close to seal off the section 38 from the fuel outlet while the one-way valve 37 will open to allow fuel to flow through the passage 35 to fill the cavity 38. The cavity 38 can then be charged with fresh fuel charge ready for the next injection of fuel into the air inlet passage 20.

In FIG. 2 the control line 26 can be seen connected electrically to the stack 34 of piezo-electric elements and also electrically connected to the high-voltage electrostatic charging electrode 41.

The fuel injector of FIG. 2 operates as a positive displacement pump which, in each and every operation of the injector, dispenses the same amount of fuel. The volume of fuel delivered by the injector is constant for each operation. This varies significantly from injectors which function as on/off valves controlling flow of fluid through them, the fluid supplied to them being supplied from a pressurised source. Such injectors control the amount of fuel delivered by varying the opening time of the injector. There is no such variation of opening time with the injector of the present invention, instead it functions as a positive displacement pump and pumps out a set volume of fuel in each and every operation.

A second type of fuel injector suitable for the operation as the injector 19 of FIG. 1 is shown in FIG. 3. The injector 19 in each and every operation delivers a set amount of fuel and the injector itself operates as a pump to positively displace a volume of fuel therefrom, the volume remaining constant across each and every operation of the injector. The injector 19 is a simple positive displacement pump with a solenoid driven piston sliding in a cylinder working as a fixed displacement unit, with two one-way check valves to ensure the correct flow path of the fluid into and out of the injector. The injector acts both as a pumping unit and as a flow metering unit. The flow volume delivered by each pulse is a fixed geometric volume regardless of differential pressure across the injector, making the injector insensitive to pressure fluctuations in the intake passage 20 of the intake manifold.

The injector of FIG. 2 has a fuel inlet passage 50 which will be connected to a fuel tank (not shown) to receive fuel under a simple gravity feed arrangement (not shown). A sprung-loaded one-way valve 51 controls flow of fuel from the inlet passage 50 into a fuel chamber 52 of the injector. A sprung-loaded one-way valve 53 controls flow of fuel out of the fuel cavity 52 to a fuel outlet pipe 54 through which the fuel can be delivered (directly or via a conduit to a remote spray nozzle) into the air intake passage 20.

A piston 55 is slidably located in the injector body. It is acted upon by a biasing spring 56 and is surrounded by a solenoid 57. An end plate 58 is connected to the piston 55 and extends radially outwardly from the piston across an end face of the solenoid 57. The solenoid 57 is connected by the line 26 to the ECU 23.

Starting from a condition in which the piston 55 is biased to its lowermost point by the biasing spring 56 (i.e. the point at which the fuel chamber 52 has its greatest volume), the fuel chamber 52 will be primed with fuel ready for injection. Energisation of the solenoid 57 then acts to pull the plate 58 into contact or near contact with the solenoid 57. The piston 55 moves upwards against the force of the biasing spring 56 to reduce in volume the fuel chamber 52. This causes the positive displacement of fuel from the fuel chamber 52, the one-way valve 53 opening to allow the piston 55 to expel fuel from the fuel chamber 52 out of the fuel outlet 54.

Once the solenoid 57 is de-energised, then the biasing spring 56 will force the piston 55 downwardly and the plate 58 away from the solenoid 57. The downward motion of the piston 55 will cause the fuel chamber 52 to increase in volume and this will have the effect of closing the one-way valve 53 and opening the one-way valve 51. The moving piston 55 draws fuel from the fuel inlet 50 into the fuel chamber 52 to fully charge the fuel chamber 52 ready for the next dispensing of fuel.

The injector is constructed so that the piston 55 has a set distance of travel in each operation. The piston 55 moves between two end stops. Thus, in each and every operation of the injector, the piston 55 displaces a set amount of fuel and a set amount of fuel is dispensed out of the fuel outlet 54. The amount of fuel dispensed by the injector is constant for each and every operation.

A typical fixed volume of fuel dispensed by the injector is commonly between 0.1 µl and 1 µl, but typically less than 0.5 µl. The injector typically is capable of operating at frequencies from 300 Hz to greater than 1 KHz, preferably between 1 KHz and 2 KHz. Such a volume and frequency of operation is suitable for many engine capacities in the small engine market.

The operating principle of the FIG. 3 injector is to deliver a geometrically fixed volume of fluid for each actuation pulse. As engines of different capacity and power output will have different fuel consumption rates it is necessary to optimise the pulse volume to best suit the individual engine.

In order to manufacture the FIG. 3 injector in high volumes and hence lowest possible cost it is advantageous to have one size of injector that will fit a wide range of different size engines. In order to achieve this, the stroke of the piston of the injector can easily be adjusted during manufacture by the fitment of a shim to give the desired pulse volume for specific application of each injector.

Figure 4:
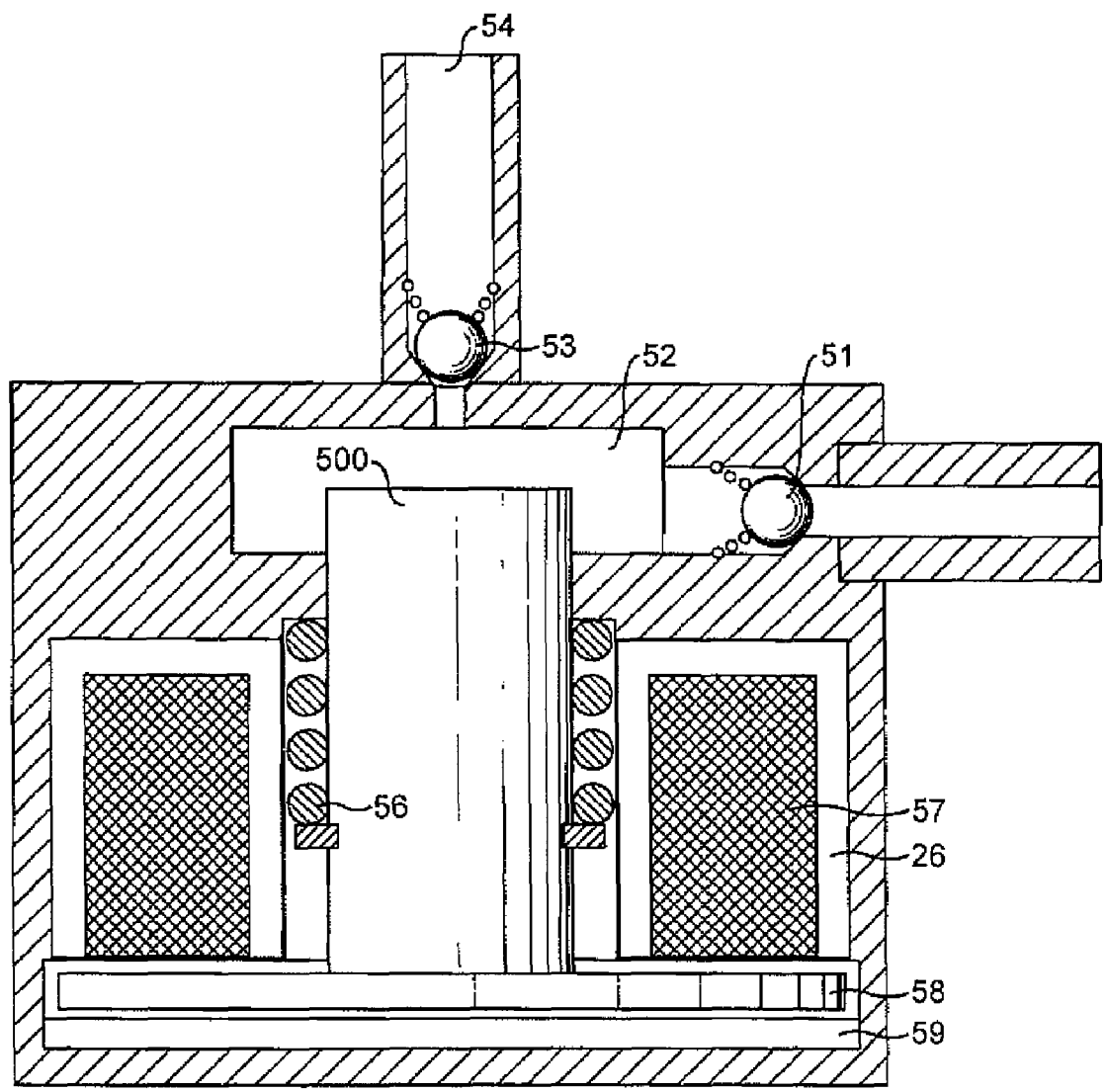
FIG. 4 illustrates a modification of the FIG. 3 fuel injector.

FIG. 3 shows an injector without a shim resulting in the maximum possible stroke of the piston 55 at each pulse. The same injector with a shim 59 fitted as shown in FIG. 4. By use of the shim 59 the stroke of the piston 55 is reduced, allowing the injector to be optimised for a smaller capacity engine. The delivery volume of the injector is still geometrically fixed and repeatable for each actuation during its operation.

The key feature is that the displacement of the injector is always a constant geometric volume, to ensure accuracy of fuel delivery when in use on a engine. But the use of shims allows cost effective high volume manufacture of substantially identical injector units which can be easily configured to suit a wide range of engines at the last stage of manufacture.

Figure 5:
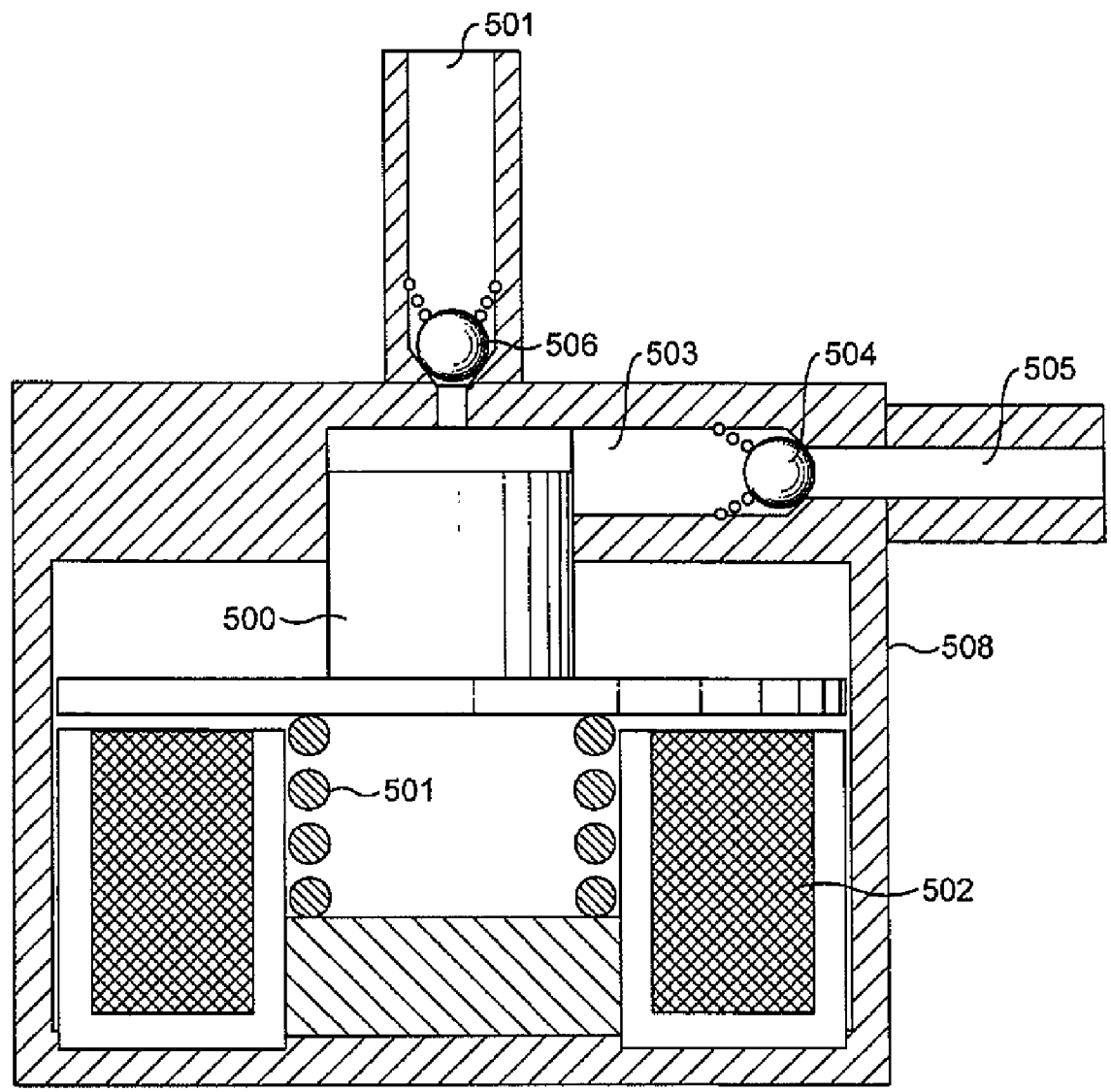
FIG. 5 is a schematic illustration of a third type of fuel injector suitable for use in the engine of FIG. 1.

FIG. 5 shows a fourth embodiment of injector according to the present invention. As with the FIGS. 3 and 4 embodiments, the injector comprises a piston 500 movable under the action of a biasing spring 501 and a solenoid 502. The piston 500 is slidable into a fuel chamber 503. A one-way inlet valve 504 allows fuel to be drawn into the fuel chamber 503 from a fuel inlet 505, but prevents fuel being expelled from the fuel chamber 503 to the fuel inlet 505. A one-way outlet valve 506 allows fuel to be expelled from the fuel chamber 503 to a fuel outlet 507, but prevents fuel being drawn into the fuel chamber 503 from the fuel outlet 507.

Unlike the FIGS. 3 and 4 embodiments, the injector of FIG. 5 uses the spring 501 to force the piston 500 to expel fuel from the fuel chamber 503 to the fuel outlet 507 and uses the solenoid 502 to move the piston to draw fuel into the fuel chamber 503 (this is the reverse of the FIGS. 3 and 4 embodiments). The piston 500 has an end plate 508 which extends radially outwardly from the piston 500 across an end face of the solenoid 502. The volume of fuel displaced, spring rates, etc will be the same or similar to those described above.

Figure 6:
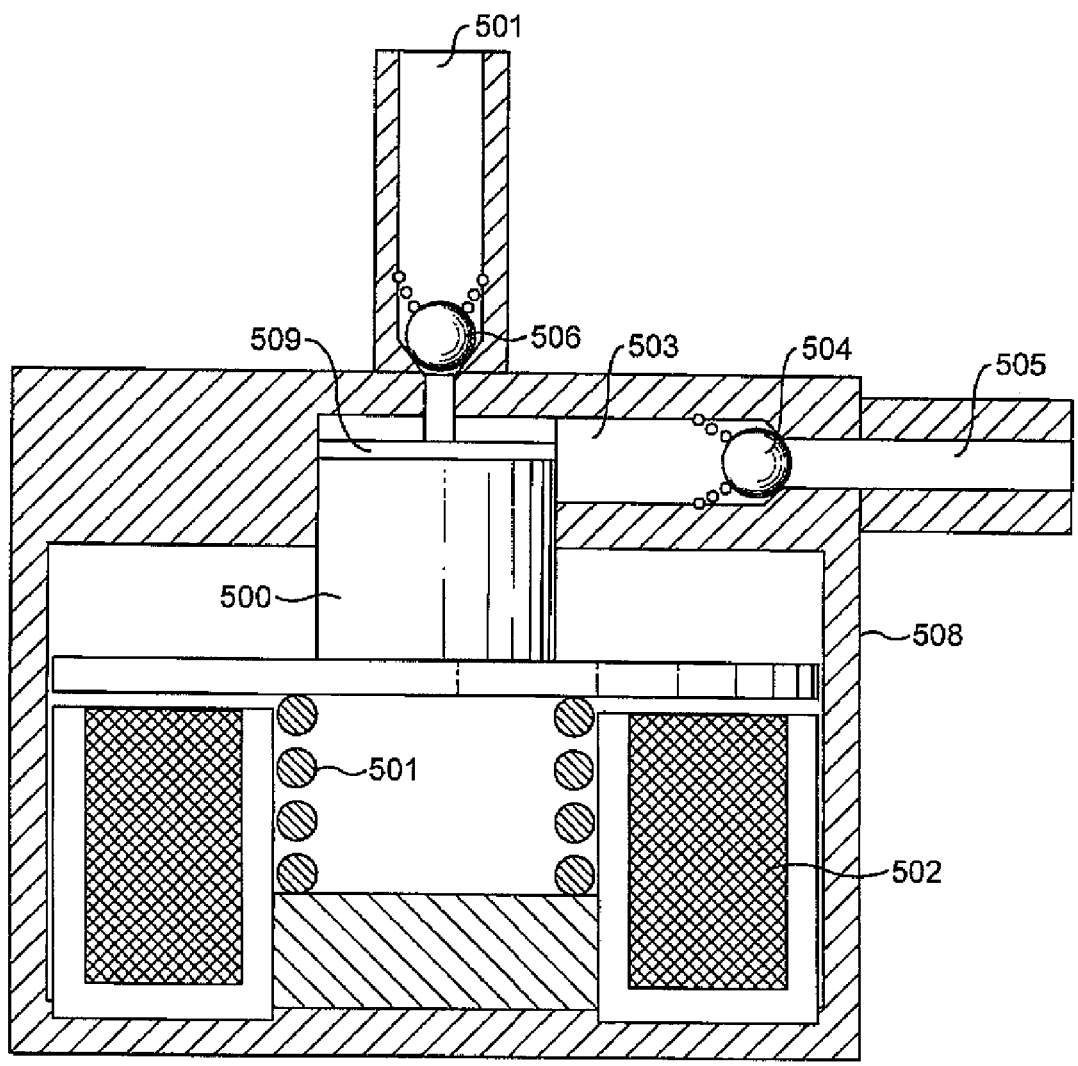
FIG. 6 illustrates a modification of the FIG. 5 fuel injector.

FIG. 6 shows a modification of the FIG. 5 embodiment in which a shim 509 is provided in the fuel chamber 503 to limit displacement of the piston 500 and thereby set the amount of fuel dispensed in each operation of the injector. The shim 509 has an aperture therethrough to allow communication of the fuel chamber 503 with the one-way outlet valve 506 and fuel outlet 501. As described above, the use of shims allows a manufacturing process in which substantially identical injector units are made with different volumes of fuel output by selection of suitably sized shims.

In FIGS. 4 and 6 the shims 59, 509 shown are fixed to the housing of the injector, however a shim could be fitted to either of the pistons 55, 500 instead of or additionally to the illustrated shims 59, 509.

FIG. 7 shows an injector 700 with a piston 701 situated in the centre of a solenoid 702 and a back-iron 703. The back-iron 703 is designed to direct the flow of magnetic flux around the solenoid windings. The piston 701 is pulled into engagement with the back-iron 703 when the solenoid 702 is energised. A piston spring 704 pushes the piston 701 away from the back-iron 703 when the solenoid is de-energised. A fuel inlet check valve 705 is situated a fuel passage passing through the piston 701. The fuel passage allows the flow of fuel through the piston to a fuel chamber 706. Fuel is dispensed from the fuel chamber 706 to a fuel outlet 707 via an outlet check valve 708. In the FIG. 7 injector advantageously the motion of the piston 701 helps the operation of the inlet check valve 705, as shown in FIGS. 8a) to d). FIG. 8a shows the piston 701 in its bottom stop position. The mass of the ball in the check valve 705 aids its own spring to close the inlet check valve 705, thus sealing the fuel chamber 706.

Figure 8B:
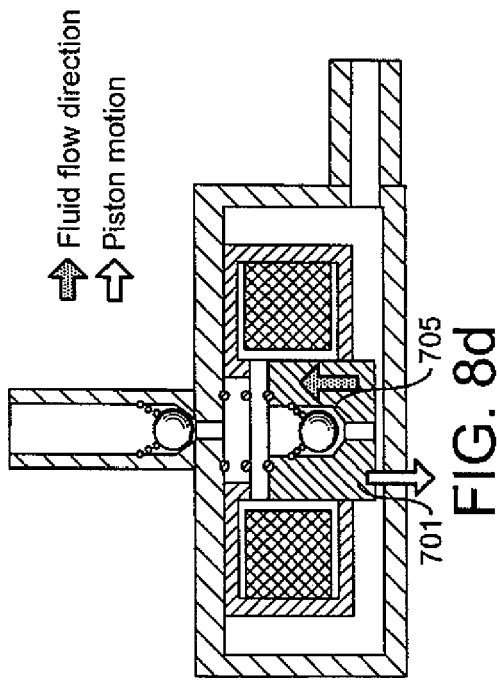
Figure 8C:
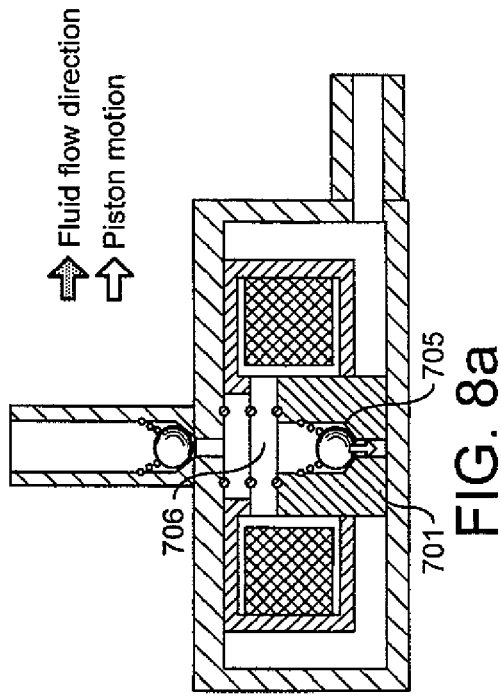

When the solenoid coil 702 is energised with an electric current, as shown in FIG. 8b), the piston 701 is drawn up by the magnetic flux flowing in the back-iron 703. In this movement the inertia of the inlet check ball urges the ball into firm contact with its seat, which ensures tight sealing of the inlet valve 705 and thus ensuring all the fluid expelled from the fuel chamber 706 flows out through the outlet check valve 708. When the piston 701 reaches its upper position, as shown in FIGS. 8c) and the pulse volume of fuel has been expelled, the piston 701 will be stopped rapidly by its end stop. The ball of the inlet check valve 705 will, however, continue upwards due to its own momentum and will open the inlet check valve 705. At this time the solenoid 702 is de-energised and the piston spring 704 urges the piston 701 downwards.

Figure 8D:
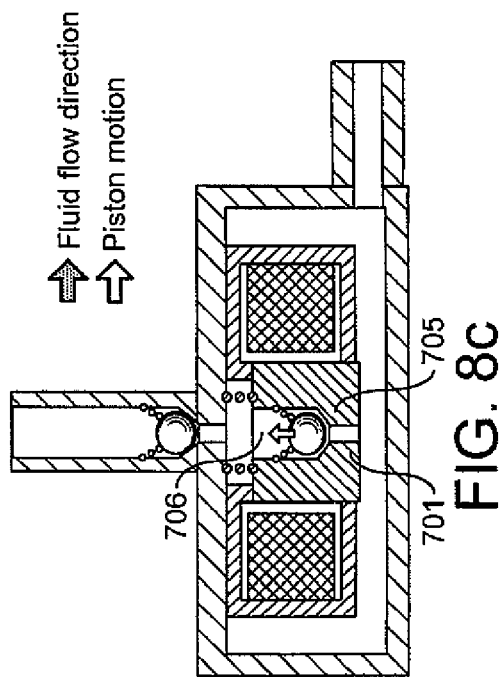

As shown in FIG. 8d), the piston 701 moves downwards driven by its spring. The ball of the inlet check valve 705 lags behind due to its mass inertia as well as the force of the fuel flow and in this condition will allow fluid to flow readily into and replenish, the fuel chamber 706 as the piston 701 continues to move downwards.

When the piston 701 reaches its bottom stop it will again be stopped rapidly and the ball of the inlet check valve 705 will be urged into contact with its seat again due to its momentum, as shown in FIG. 8a).

In this manner, the opening and closing of the inlet check valve 705 is assisted by the motion of the piston 701. This allows the injector to be driven at a higher frequency than would otherwise be possible.

FIG. 9 shows a more detailed sectioned drawing of the injector of FIGS. 7 and 8a) to 8d). The inlet check valve 705 can be seen to comprise a ball 710 and a spring 711.

The spring rate of the spring 711 of the inlet check valve 51 is typically chosen in the range 0.4 N/mm to 1.75 N/mm to allow lift of the check ball from its seat during the inlet stroke, the piston displacement is typically 50 to 150, e.g. 100 µm. The inlet check valve 51 is shown in FIG. 11 to comprise ball 710 and spring 711.

Figure 10B:
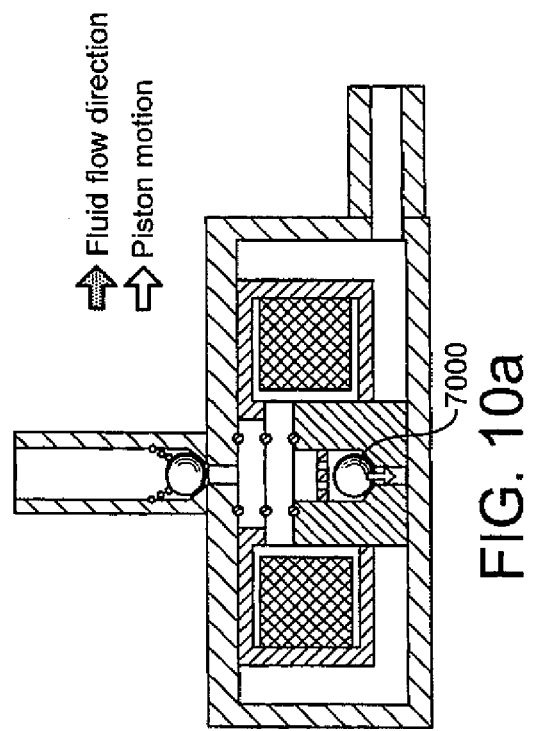
Figure 10C:
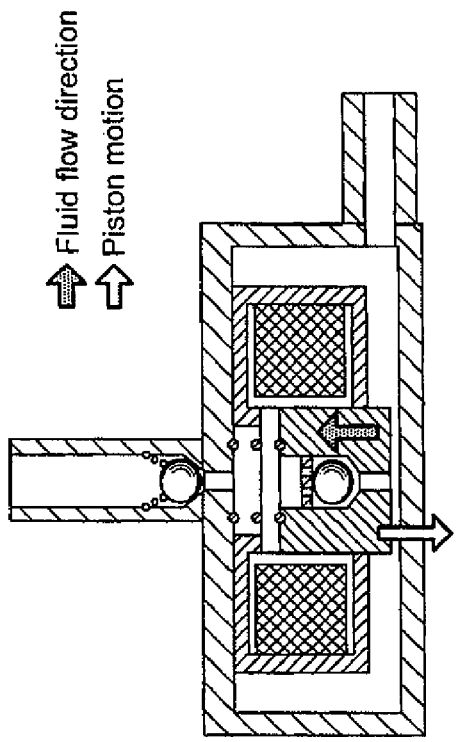
Figure 10D:
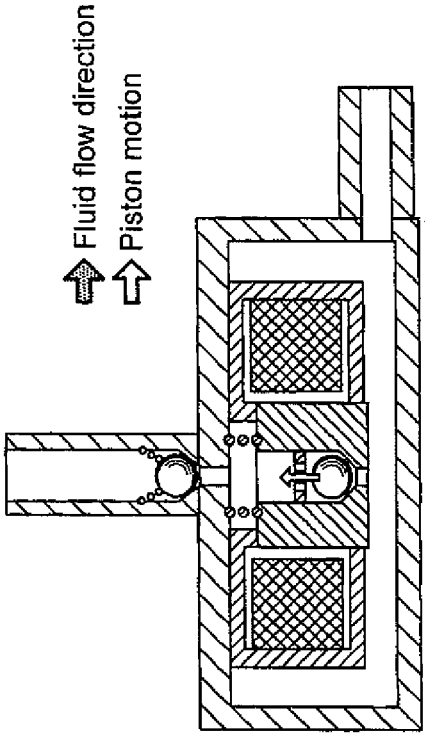

With the location of the inlet check valve in a fuel passage in the piston, it is possible to do without a check valve spring, as illustrated in FIGS. 10a) to 10d) and FIG. 12. The inlet check valve 7000 comprises (see FIG. 12) a ball 7001 movable in a cage 7002. The cage 7002 allows fuel flow, but keeps the ball 7001 trapped in position. The function of the valve 7000 is exactly as described for valve 705, but the mass inertia of the ball 7001 is relied upon as the sole means of opening and closing the valve 7000. This can be seen in FIGS. 10a) to 10d), where the ball motion and piston motion are indicated by arrows, as is the fluid flow direction. In FIG. 10a) the movement of the ball 7001 forces the valve closed. In FIG. 10b) the mass inertia of the ball 7001 lifts the ball away from the seat as the piston moves downwardly (the fluid pressure differential across the valve also plays a part). In FIG. 10d) it can be seen that the cage 7002 stops the ball 7001 from moving too far from its seat during downward motion of the piston. Using a valve without a spring reduces cost and assembly time. A disc could be used instead of a ball and/this is illustrated in FIG. 13 where a disc is movable in a cage 7011 (this valve will function in the way described above for valve 7000). The use of a disc can reduce the volume of fluid trapped in the fluid passage through the piston above the valve and make the arrangement less susceptible to trapping of gases.

The control of the injectors of the present invention is quite different from the control of the injectors of the prior art, as will now be illustrated in FIGS. 14, 15 and 16a) to 16d).

In FIG. 14 there can be seen a graphic illustration of a control signal used to control a prior art injector. The mode of operation used is called pulse width modulation control. In solid lines can be seen a pulse of a chosen width and this corresponds to the duration of opening of a traditional fuel injector. The dotted lines show other greater pulse widths, i.e. greater opening durations of traditional prior art injectors. With a set supply pressure, the control of the pulse width gives exact control of the amount of fuel delivered by the fuel injector.

Moving on to FIG. 15, FIG. 15 graphically illustrates the control signal generated by the ECU 23 to control the fuel injector 19 in the present invention. Instead of pulse width modulation, a form of control called pulse count injection is used. There can be seen in solid lines six different pulses. These are the pulses for a single cycle of engine operation, i.e. the delivery of charge fuel for a single combustion event in the combustion chamber 13. Each pulse represents one operation of the injector 19. As explained above, because the injector 19 in each and every operation delivers a set amount of fuel, the total amount of fuel delivered for combustion is controlled by controlling the number of operations of the injector for a particular engine operating cycle. In the case illustrated in solid lines, the injector 19 is operated six times to deliver a total quantity of fuel equal to six times the set amount delivered by the injector in each operation. This fuel is delivered into the air intake passage 20 for mixing with air to be delivered into the combustion chamber 13. The first operation of the injector 19 will take place whilst the inlet valve 18 is closed but it may be that the valve is open or has at least started to open by the time of the last operation of the injector 19.

In FIG. 15 the dotted line pulses show that a greater amount of fuel can be delivered in the operating cycle by operating the injector a greater number of times. FIG. 15 illustrates a total possible pulse count of 10 pulses, giving a total amount of fuel delivered of 10 times the set amount delivered by the injector in each operation.

More detail is given in FIGS. 16a) to 16e). FIG. 16a) shows the cam shaft or crank shaft signal received on line 24 by the ECU 23. The pulses illustrated in the signal give an indication of the rotational position of the crank shaft or cam shaft. It will be seen that the ECU 23 times its own pulses in the control signal it generates to be synchronised with the pulses in the timing signal shown in FIG. 16a). In fact, it is the pulses in the timing signal of FIG. 16a) which trigger the ECU 23 to generate its own control pulses, as shown in FIGS. 16b) to 16e). Alternatively the pulses of the timing signal could be generated internally in the ECU 23, with just one timing pulse power engine cycle from a crankshaft or camshaft sensor.

FIG. 16b) shows full load operation. Therefore, in each engine cycle (an engine cycle takes place between the chain dot lines in the Figure) the ECU generates a control signal shown at FIG. 16b) which comprises thirteen pulses which operate the injector 19 thirteen times. This represents the maximum amount of fuel that can be delivered for combustion in the combustion chamber 13.

FIG. 16c) shows the control signal generated in each engine cycle for part load operation. In this case, the control signal in each cycle comprises seven pulses which operate the injector 19 seven times in each engine cycle. Thus, the amount of fuel delivered in each engine cycle is $7/13$ of the total amount of fuel that is delivered in full load operation.

FIG. 16d) shows the control signal generated by the ECU through idle operation, i.e. the time when the least amount of fuel is delivered in each engine cycle. FIG. 16d) shows that the injector 19 is operated only 4 times in each engine cycle.

Finally, FIG. 16e) shows an exceptional condition of engine starting in which an over rich mixture of fuel and air is delivered into the combustion chamber 13 to enable starting of the engine. Seventeen pulse counts are shown for each engine cycle and this means that the injector 19 is operated seventeen times through each engine cycle at the time of starting the engine. The total fuel delivered is seventeen times the set amount that the injector delivers upon each operation.

It will be appreciated that the engine described above removes the need for a separate fuel pump, and a pressure regulator and dramatically simplifies the function of the ECU. The fuel injection system comprises a simple control system that counts the desired number of fuel pulses into the engine for its correct operation. Whilst this does not give the degree of control possible with the prior art system (i.e. the total volume of fuel delivered cannot be varied continuously within a range, but only by set intervals or set amounts) this will be sufficient for a simple engine such as is used in a lawnmower. Putting it another way, the control possible with pulse count injection gives a coarser control of the amount of fuel delivered to the engine, but this will be sufficient for the simple engines involved.

As described above, the fuel delivered from the injector can be passed to a simple plain orifice or nozzle (see FIG. 2) or can be passed through an atomising device such as a pressure spray nozzle (described below with reference to FIGS. 17, 18, 19, 20a) to 20d) and 21a-21d)) or an electrostatic charging unit (shown in FIG. 2). The injector (or pulsing unit) can be close-coupled to the atomising unit or located elsewhere on the engine some distance away (i.e. the FIG. 3 embodiment could have a fuel outlet that led to a dispensing nozzle some distance away from the injectors shown).

The volume of fuel delivered by the fuel injector will be to some degree dependent on engine size and the range of engine operating conditions. Typically, an injector will deliver between 0.05 mm$^3$ and 0.8 mm$^3$ per pulse. If we assume a range of 0.01 mm$^3$ to 0.5 mm$^3$ per pulse then typically the total volume delivered in each engine cycle will be between 0.5 and 10.0 mm$^3$ If this is the case then the number of pulses required for correct engine operation will vary from five to ten pulses per engine cycle for engine idling and twenty to fifty pulses per cycle for a full load operation.

As the injector controls the quantity of fuel supplied itself, there is no need for a controlled fuel supply pressure and this means that fuel may be fed directly to the injector via a gravity feed system with no problem being caused by varying pressure due to the different head of fuel as the fuel level falls. Alternatively, a simple low pressure fuel pump could be used, as often used with carburettors. The only requirement is that sufficient fuel is delivered to the injector so that it can recharge itself for the next pulse.

The total quantity of fuel delivered to the engine in each cycle (every two strokes in a two-stroke engine or every four strokes in a four-stroke engine) is determined as a multiple of the volume of fuel dispensed in each operation of the injector and the number of times the injector is operated in the cycle. The engine management system can be simply constructed to deliver a different number of pulses in its control signal depending upon the load demand required of the engine, as measured by the sensor 21. A very simple electronic control unit can therefore be constructed from just a few I.C. chips which compare throttle position as measured by the sensor 21 (e.g. a throttle position potentiometer) with a look-up table giving the required number of pulse counts for that throttle position and with the ECU then generating pulses triggered by the timing signal on line 24 and counting the number of pulses until the correct number of pulses is reached. Then the pulse injector is switched off until the next engine cycle.

Turning to FIG. 17, there is shown a throttle body 202 of an internal combustion engine. The throttle body 202 includes an inlet passage part 200 of the inlet passage 20 in FIG. 1. The inlet passage part 200 communicates at one end 204 with the engine combustion chamber 13 via inlet valve 18, and at the other end 206 with atmospheric air, typically via an air filter (not shown). Within the inlet passage part 200 is located a throttle valve 21 and downstream of the throttle valve 21, between the throttle valve 21 and the inlet valve 18 there is the fuel injector 19, of the type previously illustrated in FIGS. 3 to 13.

In the FIG. 17 arrangement fuel dispensed from the fuel chamber 52 is dispensed to the fuel outlet 214 which comprises in the FIG. 13 embodiment a mixing chamber 218 and an atomising nozzle 214. To assist in the production of a fuel and charge air mixture that will be burnt rapidly when ignited in the combustion chamber, the fuel must be effectively mixed with the charge air. Conventional carburettors and fuel injectors achieve this by having a number of holes at the end of the injector nozzle to form a fine spray of fuel from the nozzle into the charge air. The atomising nozzle 214 of the present invention is a sonic nozzle (also known in the art as a critical flow venture, or critical flow nozzle). The atomising nozzle could also be an air-blast nozzle.

Sonic nozzles are often used as fluid flow standards as they provide a constant volumetric flow rate, provided that the pressure differential across them exceeds a predetermined threshold valve. A schematic diagram of a sonic nozzle is shown in FIG. 18. The nozzle comprises a venturi 350, the internal dimensions of which narrow to provide a throat. Fluid upstream 352 of the venturi throat is at a higher pressure than that downstream 354 of the venturi throat. The fluid flowing into the nozzle is accelerated in the narrow throat region. The velocity of the fluid in the throat approaches the speed of sound. Once this condition has been realised the flow rate through the sonic nozzle will remain constant even if the downstream pressure varies significantly, provided of course, that the pressure differential across the nozzle continues to exceed the threshold valve. Thus in the present case a constant fuel flow rate into the charge air is achieved. It should be noted that a sonic nozzle will provide a constant flow rate regardless of the abruptness of the change in downstream pressure provided that the downstream pressure remains at less than about 85-90% of the upstream pressure.

In the current invention the passage of fuel through the sonic nozzle 214 aids in dispersing the fuel into the charge air. In fact, since the velocity of the fuel passing through the throat 302 approaches the speed of sound, the nozzle 214 acts as a highly efficient atomizer breaking the liquid fuel up into a mist of tiny particles. Generally, the fine r the spray of fuel in the charge air, the better the combustion process achieved. While the exact operation of sonic nozzles in atomizing fuel is not well understood, it is thought that the passage of the liquid fuel through the shock waves in the high velocity region of the sonic nozzle produces very high shear stresses on the liquid surface and cavitation bubbles within the liquid, both of these processes leading to very fine atomisation and dispersion of the fuel into the charge air.

The mixing chamber 218 is located between the outlet check valve 53 and the nozzle 226. As can be seen in FIG. 17, and in the enlarged view in FIG. 19, the throttle body 202 also comprise an air bypass passage 240. this consists of a passage which communicates with both the mixing chamber 218 and a region where air is at atmospheric pressure.

Fuel dispensed by injector 19 passes through the mixing chamber 218 and on through the sonic nozzle 226. Low pressure in the inlet passage 200 also draws air through the air bypass 240. Thus air flows through the air bypass tube 240 and entrains the fuel dispensed by the injector 19 into the mixing chamber 218. The air in the air bypass 240 is at a higher pressure than the air in the inlet passage 200, and hence as the fuel is dispensed from the nozzle 214 it is entrained in an air flow from the passage 240 via the sonic nozzle 214 into the inlet passage 200. This causes the dispensed fuel to be atomised.

FIGS. 20*a*) to 20*d*) shows operation of the "air-assisted" sonic atomiser for a port fuel injector, through the engine cycle for two different load conditions of the engine.

The injector 19 delivers the fuel and controls the fuel amount. The air motion in the intake port generates the atomisation effect. This allows each process to be fully optimised to achieve maximum effect with minimum energy.

In FIGS. 20*a*) and 20*c*) the fuel is introduced into the mixing chamber 218 during the period of the engine cycle when the engine intake valve 18 is closed. In these conditions (whatever the engine load) there is very little movement of air and so the fuel delivered over a period of time through the engine cycle will accumulate in this chamber. As the engine intake valve 18 opens air is drawn through the intake port and into the combustion chamber 13. In a part load condition shown in FIGS. 20*a*) and 20*b*) the throttle 21 is partially closed and the air flow will generate a pressure difference across the throttle 25. In a full load (wide open throttle) condition shown in FIGS. 20*c*) and 20*d*) the air velocity at this time creates a pressure drop in the throat 302 of the venturi.

With an accumulated fuel volume in the mixing chamber the air flowing through the bypass passage 240 begins to cause effervescence of the fuel and as the flow of air and entrained fuel increase in speed up the sonic nozzle 214 (due to the decreasing cross-sectional area) high shear forces are created leading to excellent atomisation of the fuel as it is blown into the intake port.

This process not only generates a well atomised fuel spray but has the advantage that its timing is coincident with the intake valve 18 being open so the fuel is taken directly into the combustion chamber 13 and not deposited on the wall of the intake port. Also this timing effect allows the remainder of the engine cycle for the metering of fuel into the mixing chamber 218, thus allowing lower pressure injectors to be used without their inherent lack of atomisation causing any problems with poorly atomised fuel.

In this manner, very well atomised fuel is delivered at the best engine timing with minimum energy usage.

Improved fuel atomisation in the inlet port improves the fuel air mixing and hence improves the combustion process in the engine which results in reduced emissions and reduced fuel consumption as well as easier starting for small engines.

The air bypass 240 is not limited to supplying air but could alternatively be connected to a gas supply to provide an alternative gas to aid in atomisation or combustion. One such example of another gas that could be used is exhaust gas from the engine (i.e. exhaust gas recirculation).

The sonic nozzle 214 can comprise orifices of difference shapes such as shown in FIGS. 16a) to 16d). The orifice of a standard sonic nozzle, when a cross-section is taken perpendicular to the flow direction, is circular as shown in FIG. 16a. Alternative shapes of the nozzle orifices comprise a linearly extending orifice as shown in FIG. 16b, a cruciform shape as shown in FIG. 16c) or alternatively a cluster of smaller circular orifices as shown in FIG. 16d.

FIG. 22 shows a further embodiment of engine according to the present invention, the engine having a mechanically powered injector which is controlled electrically, rather than an electrically powered injector as described previously.

In FIG. 22 there can be seen an internal combustion engine 80 comprising a cylinder 81 in which reciprocates a piston 82 with the cylinder 81 and piston 82 defining between them a combustion chamber 83. The piston 82 is connected by a connecting rod 84 to a crank shaft 85 which in turn is connected to a cam shaft (not shown) having cams which by their camming action operate two poppet valves 87 and 88 which are the exhaust and inlet valves of the engine. These valves are open and closed in timed relationship to the piston 82 and the cylinder 81. Return springs (not shown) will be provided to bias the poppet valves 87 and 88 into their valve seats. The engine 80 is a simple engine, for instance a single cylinder engine of a lawnmower or other garden equipment. The engine 80 has a fuel injection system comprising a fuel injector 90 arranged to deliver fuel into an inlet passage 89 upstream of the inlet valve 88. A throttle valve 91 is placed in the inlet passage 89 to throttle the flow of charge air into the combustion chamber 83. A sensor is connected to the throttle valve 91 and generates a signal indicative of the position of the throttle valve 91 which is supplied as an electrical signal to an engine control unit 92.

The fuel injection system of FIG. 22 comprises a camming surface 93 provided on a circumferential surface of a wheel 94 mounted on, and rotating with, the crankshaft 85. A fuel injector 96 is driven by the camming surface 93 and is shown in greater detail in FIG. 23.

In FIG. 23 it can be seen that the fuel injector 96 comprises a fuel inlet 97 which receives fuel fed to it from a fuel tank (not shown) by a gravity feed system (not shown). Fuel can pass from the fuel inlet 97 into a fuel chamber 98 with the flow of fuel controlled by a first sprung-loaded one way valve 99. A second sprung-loaded one way valve 100 controls flow of fuel out of the fuel chamber 98 to a fuel outlet 101. The fuel outlet 101 is connected by a fuel line 102 (see FIG. 22) to the delivery nozzle and atomiser 90.

A piston 102 is slideably mounted in a housing 103 of the injector 96 and is slideable in the fuel chamber 98. The piston 102 has a cam follower 103 which is a roller follower rotatably mounted at one end of the piston 102. The roller follower 103 will engage with and follow the camming surface 93 (see FIG. 22). The piston 102 and therefore the roller follower 103 are biased into engagement with the camming surface 93 by a biasing spring 104 which acts between the body 103 of the injector and a shoulder 105 provided to extend radially outward from the piston 102.

Also provided in the injector 96 is a control solenoid 106 which is controlled electrically by a signal provided on a line 107 along which pass control signals from the engine control unit 92. The solenoid 106 can act on an over-ride pintle 108 which comprises a rod 113 extending through the solenoid 106 and a disc 109 extending radially outward from the rod 113 over an end of the control solenoid 106.

In operation of the injector (and starting from a condition in which the piston 102 occupies a position in which the fuel chamber 98 has its greatest volume and assuming that the fuel chamber 98 is fully charged with a fresh fuel charge), the piston 102 will be pushed into the chamber 98 under the action of the camming surface 93. The piston 102 will therefore displace fuel from the chamber 98 which will flow out of the fuel outlet 101, the one-way valve 100 opening to permit dispensing of fuel from the fuel chamber 98, whilst the one-way valve 99 seals the fuel inlet 97 from the fuel chamber 98. The fuel forced out of the fuel chamber 98 will pass along the fuel pipe 102 to the delivery nozzle 90 to be delivered as a spray in the air intake passage 89. Subsequently, the piston 102 (following the profile of the cam surface 93 and under the action of the biasing spring 104) will move to increase in volume the fuel chamber 98. This will have the effect of closing the one-way valve 100 whilst opening the one-way valve 99. Fuel will then be drawn into the fuel chamber 98 from the fuel inlet 97 until a maximum volume of fuel is reached, whereupon the process will start again.

In FIG. 24 the injector 96 can be seen interacting with the camming surface 93 and it can be clearly seen that the camming surface 93 comprises pulse lobes such as 110 separated by base circle regions such as 111, the pulse lobes typically having a crest 0.1 to 0.5 mm greater in radius than the base circle. It is seen in FIG. 10 that the wheel 94 has a total of twenty pulse lobes and also a section 112 of constant radius. When the roller follower 103 engages the section 112 then the pulse injector 116 is deactivated.

If the control solenoid 107 is kept deactivated throughout a whole engine cycle then each of the pulse lobes (e.g. 110) on the cam surface will result in the dispensing of a quantity of fuel from the pulse injector 96. The injector 96 will dispense twenty separate pulses of fuel for each complete rotation of the wheel 94. It should be understood that each pulse lobe 101 will have a height relative to the base circle which is identical to all of the other pulse lobes, so that the piston 102 will in each operation move a set amount so that the amount of fuel dispensed by the injector 96 is the same for each and every operation of the injector 96, i.e. for each and every dispensing of fuel from the injector 96. The operating of the injector 96 twenty times for each rotation of the wheel 94 represents delivery of the maximum volume of fuel possible to the engine in each operating cycle, such a condition being used for instance on engine start up.

The control solenoid 107 enables control of the injector 96. When the solenoid 106 is energised, then the pintle 108 will engage the one-way valve 99 and will force it open and will keep it open. When the one-way valve 99 is open then the motion of the piston 102 results only in the drawing into the chamber 98 of fuel from the fuel inlet 97 and then the expulsion of fuel from the chamber 98 back to the fuel inlet 97. No fuel is expelled from the chamber 98 via the one-way valve 100. Thus the ECU can control the operation of the injector 96 and can control how many pulses of fuel are delivered by the injector 96 and consequently the total amount of fuel delivered in each engine cycle (every two strokes in a two-stroke engine or every four strokes in a four-stroke engine).

In FIG. 25 there can be seen an injector 150 which could be used in the FIG. 7 engine in place of the injector 96 illustrated in the Figure. The injector 150 comprises a fuel inlet 151 which receives fuel fed to it from a fuel tank (not shown) by a gravity feed system (not shown). Fuel can pass from the fuel inlet 151 into a fuel chamber 152 with the flow of fuel controlled by a first spring-loaded one-way valve 153. A second spring-loaded one-way valve 157 controls flow of fuel out of the fuel chamber 152 to a fuel outlet 154. The fuel outlet 154 will be connected by the fuel line 120 of FIG. 7 to the delivery nozzle and atomizer 90.

A resilient displacement diaphragm 155 seals the fuel chamber 152. The diaphragm 155 is provided with a cam follower contact pad 156. The contact pad 156 will engage with and follow a camming surface (not shown). The contact pad 156 is biased into engagement with the camming surface by the resilience of the diaphragm 155. The camming surface will be variable in nature under the control of the ECU 92 in order to delivery a variable number of impulses to the contact pad 156. This will be achieved, for instance, by mounting a second control wheel 95 as alongside the cam wheel 94 rotatable with the cam wheel 94, but also rotatable with respect to the cam wheel 94 under the control of the ECU. Such an arrangement of cam wheel 94 and control wheel 95 is shown in FIG. 26. Control wheel 95 has a first sector 95a with a periphery of a constant radius equal to the radial distance to the peak of each lobe 110 of the cam wheel 94 and a second sector 95b with a periphery of a constant radius equal to the radial distance to the bottom of each base circle region 111 of the cam wheel 111. At one extreme, the second sector 95b of the control wheel 95 aligns with all the lobes and base circle sections of the cam wheel 94 and they are all active in displacing the diaphragm 155. Then, as the control wheel 95 and the cam wheel 94 are rotated relative to each other, the first sector 95a of the control wheel aligns with some of the cam lobes 110 and the base circle sections 111 and "disables" them since the greater radial height of the control wheel 95 "overrides" the base circle portions 111 of the cam wheel 94.

In operation of the injector 150 (and starting from a position in which the diaphragm 155 occupies a position in which the fuel chamber 152 has its greatest volume and assuming that the fuel chamber 152 is fully charged with fresh fuel charge) the diaphragm will be flexed under the action of a cam 110 to reduce in volume the fuel chamber 152 and thereby displace fuel from the chamber 152 to flow out of the fuel outlet 154, the one-way valve 157 opening to permit dispensing of fuel from the fuel chamber 152, whilst the one-way valve 153 seals the fuel inlet 151 from the fuel chamber 152. The fuel forced out of the fuel chamber 152 will pass along the fuel pipe 120 to the delivery nozzle 90 to be delivered as a spray in the air inlet passage. Subsequently, the diaphragm 155 (following the profile of the cam surface and due to its own resilience), will flex to increase in volume the fuel chamber 152. This will have the effect of closing the one-way valve 157 while opening the one-way valve 153. Fuel will then be drawn into the fuel chamber 152 from the fuel line 151 until a maximum volume is reached, whereupon the process will start again.

In each operating cycle of the engine the diaphragm 155 will be flexed to expel fuel from the fuel chamber 152 by each cam lobe operable in that cycle, the number of operable cam lobes being selected by the ECU, for instance, by rotating the above described control wheel relative the cam wheel.

As with the FIG. 1 engine, the FIG. 22 engine does not need a high pressure pump to pressurise the fuel supply or pressure regulator to control the pressure of the supplied fuel. Nor does the engine need a sophisticated ECU to control the operation of a fuel injector. Instead, the ECU can be constructed from simple I.C. chips, which together select the appropriate number of pulses for a given engine load (as sensed by the engine load sensor 91) and then count the number of delivered pulses in an engine cycle before deactivating the injector.

With the FIG. 22 engine it might even be possible to arrange for a mechanical control for the injector 96 by means of some linkage between the throttle and the injector 96.

In all of the embodiments of engine described above, only a single injector has been used for each working cylinder of the engine. However, the applicant envisages that each working cylinder could be provided with a plurality of injectors. This could have two advantages. First, in order to deliver a given amount of fuel in each engine cycle the number of operations of each individual injector would be decreased and this could have practical benefits since each injector would not need to operate at such a fast speed in use. Secondly, if the injectors for a particular working cylinder were constructed so that they delivered a differing amount of fuel to each other, then the engine management system could control the operation of both in a way that would give a "finer" control of the amount of fuel delivered in each working cycle. For instance, if an engine is provided with a single injector which injects 0.1 mm$^3$ per pulse, then the total fuel injected per engine cycle will have to be a multiple of 0.1 mm$^3$, i.e. 0.1 mm$^3$, 0.2 mm$^3$, 0.3 mm$^3$ up to 0.5 mm$^3$. However, if an engine is provided with two injectors, one which injects a pulse of 0.1 mm$^3$ and the other which injects a pulse of 0.05 mm$^3$ then the engine will be able to deliver in each engine cycle a total amount of fuel which could be 0.05 mm$^3$, 0.1 mm$^3$, 0.15 mm$^3$, 0.2 mm$^3$ etc. This is achieved with a smaller number of injector operations than would be necessary if the working cylinder had only an injector capable of a pulse of 0.05 mm$^3$.

The invention claimed is:

1. An internal combustion engine comprising:
   a variable volume combustion chamber;
   an air intake system for delivering charge air to the combustion chamber, the air intake system comprising an inlet passage though which air is delivered to the combustion chamber;
   an exhaust system for relaying combusted gas from the combustion chamber to atmosphere; and
   a fuel injection system for delivering fuel into the charge air in the inlet passage for combustion therewith in the combustion chamber; wherein the fuel injection system comprises:
   a plurality of fuel injectors each of which functions as a positive displacement pump and dispenses an amount of fuel which is fixed for each and every operation of the injector;
   at least a first fuel injector of the plurality of fuel injectors dispensing a first set amount of fuel different to a second set amount dispensed by a second fuel injector of the plurality of fuel injectors; and
   a controller which controls the operation of each of the plurality of fuel injectors;
   wherein:
   in each of at least a majority of engine cycles the fuel injectors are operated on a plurality of occasions by the controller;
   in response to an increasing engine speed and/or load the controller increases in amount the fuel delivered per engine cycle by increasing in number the occasions the fuel injectors are operated per engine cycle; and in response to a decreasing engine speed and/or load the controller reduces in amount the fuel delivered per engine cycle by reducing in number the occasions the fuel injectors are operated per engine cycle.

2. An internal combustion engine as claimed in claim 1 wherein each fuel injector uses electrical power to dispense fuel therefrom and the controller is an electronic controller which produces a pulsed control signal to control each fuel injector, each pulse causing each fuel injector to dispense fuel and the electronic controller varying the number of pulses per engine cycle to vary the amount of fuel delivered.

3. An internal combustion engine as claimed in claim 2 wherein each fuel injector comprises a stack of piezo-electric elements which on increasing in length force fuel out of the fuel injector.

4. An internal combustion engine as claimed in claim 2 wherein each fuel injector comprises an electrical coil.

5. An internal combustion engine as claimed in claim 4 wherein each fuel injector comprises a housing in which a fuel chamber is formed, from which chamber fuel is forced out of each fuel injector, each fuel injector having a fuel inlet for admitting fuel into the fuel chamber and a fuel outlet via which fuel is forced from each fuel injector, each fuel injector also having a first one-way valve which allows fuel to flow into the fuel chamber from the fuel inlet while preventing flow of fuel from the fuel chamber back to the fuel inlet and each fuel injector further having a second one-way valve which permits fuel to flow out of the fuel chamber to the fuel outlet, while preventing flow of fuel back into the fuel chamber from the fuel outlet.

6. An internal combustion engine as claimed in claim 4 wherein a sensor is provided to monitor engine load and to provide to the electronic controller a signal indicative of engine load, the electronic controller calculating how many pulses to produce in each engine cycle having regard to the engine load.

7. An internal combustion engine as claimed in claim 6 wherein a sensor is associated with a crankshaft or a camshaft of the engine and produces a timing signal related to rotation of the crankshaft or camshaft, which timing signal is used by the electronic controller to trigger the pulses generated thereby.

8. An internal combustion engine as claimed in claim 1, further comprising a venturi provided in the inlet passage, a throttle valve in the inlet passage and a bypass passage delivering air to the inlet passage downstream of the throttle valve, wherein the fuel injector delivers fuel to a mixing chamber in which the fuel is entrained by air from the bypass passage with the mixed fuel and air then delivered via a nozzle to a throat of the venturi.

9. An internal combustion engine as claimed in claim 8 wherein the air bypass passage is connected to atmosphere.

10. An internal combustion engine as claimed in claim 1, further comprising a venturi provided in the inlet passage; a throttle valve in the inlet passage; and a bypass passage delivering exhaust gases or a mixture of air and exhaust gases to the inlet passage downstream of the throttle valve; wherein: the fuel injector delivers fuel to a mixing chamber in which fuel is entrained by gas from the bypass passage with the mixed fuel and gas then delivered via a nozzle to the throat of the venturi.

11. An internal combustion engine as claimed in claim 10 wherein the nozzle is a sonic nozzle.

12. An internal combustion engine as claimed in claim 10 wherein the nozzle is an atomising nozzle having a non-circular orifice.

13. An internal combustion engine as claimed in any one of claim 10 wherein the nozzle is an atomising nozzle having an array of orifices.

14. An internal combustion engine comprising:

a variable volume combustion chamber;

an air intake system for delivering charge air to the combustion chamber, the air intake system comprising an inlet passage though which air is delivered to the combustion chamber;

an exhaust system for relaying combusted gas from the combustion chamber to atmosphere; and a fuel injection system for delivering fuel into the charge air in the air intake passage for combustion therewith in the combustion chamber; wherein the fuel injection system comprises:

a fuel injector which functions as a positive displacement pump and dispenses an amount of fuel which is fixed for each and every operation of the injector; and a controller which controls the operation of the fuel injector;

wherein:

in each of at least a majority of engine cycles the fuel injector is operated on a plurality of occasions by the controller;

in response to an increasing engine speed and/or load the controller increases in amount the fuel delivered per engine cycle by increasing in number the occasions the fuel injector is operated per engine cycle;

in response to a decreasing engine speed and/or load the controller reduces in amount the fuel delivered per engine cycle by reducing in number the occasions the fuel injector is operated per engine cycle; and the fuel injector comprises:

a housing in which a fuel chamber is formed;

an electrical coil; and a piston which slides axially in a bore in the housing under the action of the electrical coil, the piston sliding between two end stops which ensure that the piston has a set distance of travel in each operation.

15. An internal combustion engine as claimed in claim 14 wherein the fuel injector comprises a biasing spring acting on the piston.

16. An internal combustion engine as claimed in claim 15 wherein the electrical coil surrounds the piston.

17. An internal combustion engine as claimed in claim 16 wherein an end plate is connected to the piston and extends outwardly from the piston across an end face of the electrical coil.

18. An internal combustion engine as claimed in claim 14 wherein the fuel injector comprises a fuel inlet, a fuel outlet, a one-way inlet valve which allows fuel to be drawn into the fuel chamber from the fuel inlet while preventing fuel being expelled from the fuel chamber to the fuel inlet and a one-way outlet valve which allows fuel to be expelled from the fuel chamber to the fuel outlet whilst preventing fuel being drawn into the fuel chamber from the fuel outlet.

19. An internal combustion engine as claimed in claim 18 wherein the one-way inlet valve is a sprung-loaded valve.

20. An internal combustion engine as claimed in claim 19 wherein the one-way outlet valve is a sprung-loaded valve.

21. An internal combustion engine as claimed in claim 18 wherein the one-way inlet valve is provided in a fuel inlet passage in the housing.

22. An internal combustion engine as claimed in claim 18 wherein the piston is provided with a fuel inlet passage via which fuel is delivered into the fuel chamber and the one-way inlet valve is provided in the fuel inlet passage in the piston, the one-way inlet valve comprising a movable valve member which seals against a seat and the one-way inlet valve arranged so that momentum of the valve member arising from movement of the piston assists both in opening of and closing of the one-way inlet valve.

23. An internal combustion engine as claimed in claim 22 wherein the valve member is a ball.

24. An internal combustion engine as claimed in claim 22 wherein the valve member is a disc.

25. An internal combustion engine as claimed in claim 14 wherein a piston spring biases the piston to engage one of the end stops and the solenoid acts to slide the piston into engagement with the other end stop against a biasing force applied by the piston spring.

26. An internal combustion engine as claimed in claim 25 wherein the piston spring biases the piston to expel fuel from the fuel chamber.

27. An internal combustion engine as claimed in claim 25 wherein the piston spring biases the piston to draw fuel into the fuel chamber.

28. An internal combustion engine as claimed in claims 14 comprising a shim which provides one of the end stops.

29. A method of manufacture of an internal combustion engine as claimed in claim 28 comprising selecting a shim sized to provide a chosen set distance of travel.

30. An internal combustion engine as claimed in claim 14 comprising a shim attached to the piston.

31. A method of manufacture of an internal combustion engine as claimed in claim 30 comprising selecting a shim sized to provide a chosen set distance of travel.

32. A method of manufacture of a plurality of internal combustion engines as claimed in claim 14 wherein the engines are provided with fuel injectors which dispense different set amounts of fuel by setting different distances of travel for the pistons of the injectors of the engines by using shims to set piston travel distances in some and not using any shims in others and selecting differently sized shims for different engines to give different piston travel distances.

33. An internal combustion engine as claimed in claim 14, further comprising a venturi provided in the inlet passage; a throttle valve in the inlet passage and a bypass passage delivering air to the inlet passage downstream of the throttle valve; wherein: each fuel injector delivers fuel to a mixing chamber in which the fuel is entrained by air from the bypass passage with the mixed fuel and air then delivered via a nozzle to a throat of the venturi.

34. An internal combustion engine as claimed in claim 33 wherein the air bypass passage is connected to atmosphere.

35. An internal combustion engine as claimed in claim 33 wherein the nozzle is a sonic nozzle.

36. An internal combustion engine as claimed in claim 33 wherein the nozzle is an atomising nozzle having a non-circular orifice.

37. An internal combustion engine as claimed in claim 33 wherein the nozzle is an atomising nozzle having an array of orifices.

38. An internal combustion engine as claimed in claim 14, further comprising a venturi provided in the inlet passage; a throttle valve in the inlet passage; and a bypass passage delivering exhaust gases or a mixture of air and exhaust gases to the inlet passage downstream of the throttle valve; wherein each fuel injector delivers fuel to a mixing chamber in which fuel is entrained by gas from the bypass passage with the mixed fuel and gas then delivered via a nozzle to the throat of the venturi.

39. A method of operating the internal combustion engine as claimed claim 14, the method comprising:
using the fuel injector to deliver to the combustion chamber in each engine cycle a plurality of pulses of fuel; and
varying in number the pulses of fuel from engine cycle to engine cycle in response to changes in engine speed and/or load to thereby control a total quantity of fuel delivered to the combustion chamber in each cycle.

40. A method as claimed in claim 39 wherein the number of pulses of fuel per engine cycle is kept at a first high level for a period immediately following starting of the engine and then reduced to lower levels for subsequent engine cycles until the engine is next started.

41. An internal combustion engine comprising:
a variable volume combustion chamber;
an air intake system for delivering charge air to the combustion chamber, the air intake system comprising an inlet passage though which air is delivered to the combustion chamber;
an exhaust system for relaying combusted gas from the combustion chamber to atmosphere; and
a fuel injection system for delivering fuel into the charge air in the inlet passage for combustion therewith in the combustion chamber; wherein the fuel injection system comprises:
a plurality of fuel injectors each of which functions as a positive displacement pump and dispenses an amount of fuel which is fixed for each and every operation of the injector, at least a first fuel injector of the plurality of fuel injectors dispensing a first set amount of fuel different to a second set amount of fuel dispensed by a second fuel injector of the plurality of fuel injectors; and
a controller which controls the operation of the fuel injectors;
wherein:
in each of at least a majority of engine cycles the fuel injector is operated on a plurality of occasions by the controller;
in response to an increasing engine speed and/or load the controller increases in amount the fuel delivered per engine cycle by increasing in number the occasions each fuel injectors are operated per engine cycle;
in response to a decreasing engine speed and/or load the controller reduces in amount the fuel delivered per engine cycle by reducing in number the occasions each fuel injector is operated per engine cycle; and
each fuel injector comprises:
a housing in which a fuel chamber is formed;
an electrical coil; and
a piston which slides axially in a bore in the housing under the action of the electrical coil, the piston sliding between two end stops which ensure that the piston has a set distance of travel in each operation.

* * * * *